(12) United States Patent
Cao

(10) Patent No.: US 9,143,844 B2
(45) Date of Patent: Sep. 22, 2015

(54) DATA CROSS-CONNECT SYSTEM AND METHOD

(71) Applicant: Huawei Technologies Co., Ltd., Shenzhen, Guangdong (CN)

(72) Inventor: Shiyi Cao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/163,748

(22) Filed: Jan. 24, 2014

(65) Prior Publication Data

US 2014/0140697 A1 May 22, 2014

Related U.S. Application Data

(63) Continuation of application No. PCT/CN2011/077786, filed on Jul. 29, 2011.

(51) Int. Cl.
*H04Q 11/00* (2006.01)
*H04L 12/933* (2013.01)

(52) U.S. Cl.
CPC ........ *H04Q 11/0005* (2013.01); *H04L 49/1515* (2013.01); *H04Q 11/0066* (2013.01);
(Continued)

(58) Field of Classification Search
CPC .......... H04Q 11/0005; H04Q 11/0066; H04Q 2011/0015; H04Q 2011/0016; H04Q 2011/0018; H04Q 2011/0032; H04Q 2011/0045; H04Q 2011/0056; H04Q 2011/0054; H04Q 2011/0058; H04L 49/1515
See application file for complete search history.

(56) References Cited

U.S. PATENT DOCUMENTS

2004/0067011 A1 4/2004 Kim et al.
2004/0126057 A1 7/2004 Yoo
(Continued)

FOREIGN PATENT DOCUMENTS

| CN | 1488964 A | 4/2004 |
|---|---|---|
| CN | 101106426 A | 1/2008 |
| CN | 101621714 A | 1/2010 |
| CN | 101621715 A | 1/2010 |

(Continued)

OTHER PUBLICATIONS

Wang, "Development of Optical Fiber Communication Network and Photonic Integration (I)," Tech Insights (2001).

(Continued)

*Primary Examiner* — Leslie Pascal
(74) *Attorney, Agent, or Firm* — Leydig, Voit & Mayer, Ltd.

(57) ABSTRACT

The present invention provides a data cross-connect system and method. The data cross-connect system comprises: at least two first stage cross-connect modules, at least one second stage cross-connect module and at least one third stage cross-connect module; the first stage cross-connect module comprises: a first stage cross-connect sub-module, a signal packaging sub-module, a first information generation sub-module and at least one transmitter. The present invention allows high rate interconnection between subracks, therefore the number of interconnecting optical fibers and connectors of the optical fibers can be reduced; in addition, the second stage cross-connect module applies cross-connecting directly in the optical layer, hence the number of cross-connect subracks can be reduced and the size and power consumption of the cross-connect subracks can also be reduced.

22 Claims, 12 Drawing Sheets

(52) U.S. Cl.
CPC ............. *H04Q 2011/0015* (2013.01); *H04Q 2011/0016* (2013.01); *H04Q 2011/0018* (2013.01); *H04Q2011/0032* (2013.01); *H04Q 2011/0045* (2013.01); *H04Q 2011/0054* (2013.01); *H04Q 2011/0056* (2013.01); *H04Q 2011/0058* (2013.01)

(56) References Cited

U.S. PATENT DOCUMENTS

| | | |
|---|---|---|
| 2008/0247387 A1 | 10/2008 | Neilson |
| 2011/0097090 A1 | 4/2011 | Cao |
| 2012/0243868 A1* | 9/2012 | Meyer et al. .................. 398/46 |

FOREIGN PATENT DOCUMENTS

| | | |
|---|---|---|
| EP | 1505781 A1 | 2/2005 |
| WO | WO 2008072819 A1 | 6/2008 |

OTHER PUBLICATIONS

"Interfaces for the Optical Transport Network (OTN)," Series G: Transmission Systems and Media, Digital Systems and Networks; Digital terminal equipments—General; Series Y: Global Information Infrastructure, Internet Protocol Aspects and Next-Generation Networks; Internet protocol aspects—Transport, Recommendation G.709/Y.1331, Amendment 2, ITU-T (Apr. 2011).

* cited by examiner

DATA CROSS-CONNECT SYSTEM AND METHOD

CROSS-REFERENCE TO RELATED APPLICATIONS

This application is a continuation of International Patent Application No. PCT/CN2011/077786, filed on Jul. 29, 2011, which is hereby incorporated by reference in its entirety.

TECHNICAL FIELD

The present invention relates to communication technology, and particularly, to a data cross-connect system and method.

BACKGROUND

The requirements on the capacity of the transmission network nodes have been growing along with the rapid growth of network traffics. However, single-subrack transmission equipments are subject to size and power consumption limits and thus can offer only limited growth in the equipments' cross-connect capacity, which cannot catch up with the speed of network traffic growth.

In order to provide larger cross-connect capacity, multiple subrack cascade can be used to build a cluster cross-connect system, i.e., connect at least two cable subrack and cross-connect subrack via optical fiber to build a cross-connect system with super large capacity. In the equipments in such cluster cross-connect system, 3-stage CLOS matrix is usually used as multilevel cross-connect matrix.

In a technical scheme of the prior art, electrical cross-connect subrack is used to realize cluster cross-connect system. In a cluster cross-connect system using electrical cross-connect subracks, the second stage uses electrical cross-connecting. Since the second stage uses electrical cross-connecting and supports cross-connect matrix of cross-connecting at smaller granularity, the signal rate of interconnection signals between subracks is higher and the number of interconnecting optical fibers can thus be reduced.

But the power consumption and the size of the cluster cross-connect system using electrical cross-connect subracks are large. In addition, as synchronization is difficult by using electrical cross-connect subrack, the 3-stage cross-connect matrix may need to be designed to support strict sense non-blocking, i.e., the output capacity of the first stage cross-connect basically needs to be 1 times more than the input capacity (and the number of basic cross-connect units in the second stage will need to double accordingly, the situation of the third stage is similar to the first stage), which will lead to much growth in the number of interconnecting optical fibers between subracks and the power consumption and the size of cross-connect subracks.

In an alternative technical scheme of the prior art, Micro-electromechanical System (MEMS) is used directly to switch the cross-connect granules, i.e., the basic cross-connect units in the second stage of the cluster cross-connect system consist of MEMS devices which switch signals directly in the optical layer. Since there is no need to cross connect in the electrical layer in the second stage, the power consumption of the cross-connect subracks can be reduced significantly.

However, the overall interconnection rate of the cluster cross-connect system using MEMS is too low and too many interconnecting optical fibers are needed. In addition, the switch speed of the MEME devices is very slow, hence the cluster cross-connect system using MEMS can only adopt strict sense non-blocking, too, which further increases the number of interconnecting optical fibers and cross-connect subracks.

SUMMARY

The present invention provides a data cross-connect system and method to reduce the number of interconnecting optical fibers and cross-connect subracks as well as the size and power consumption of the cross-connect subracks.

The present invention provides a data cross-connect system, comprising: at least two first stage cross-connect modules, at least one second stage cross-connect module and at least one third stage cross-connect module;

the first stage cross-connect module comprises: a first stage cross-connect sub-module, a signal packaging sub-module, a first information generation sub-module and at least one transmitter;

the first information generation sub-module is configured to generate first information;

the first stage cross-connect sub-module is configured to apply a first stage cross-connecting to input data signals based on the first information generated by the first information generation sub-module to obtain at least one channel of data signals and sending the at least one channel of data signals to the signal packaging sub-module;

the signal packaging sub-module is configured to receive the at least one channel of data signals sent by the first stage cross-connect sub-module, packaging the at least one channel of data signals into at least one channel of electrical signals and sending the at least one channel of electrical signals to the at least one transmitter;

the at least one transmitter is configured to convert the at least one channel of electrical signals packaged by the signal packaging sub-module into at least one channel of optical signals whose effective areas are aligned, and sending the at least one channel of optical signals to the at least one second stage cross-connect module;

the at least one second stage cross-connect module is configured to apply a second stage cross-connecting to the at least one channel of optical signals sent by the at least one transmitter included in each of the at least two first stage cross-connect modules respectively, and sending the optical burst signals obtained after the cross-connecting to the at least one third stage cross-connect module;

the at least one third stage cross-connect module is configured to receive the optical burst signals sent by the at least one second stage cross-connect module, converting the optical burst signals into electrical signals, unpackaging the electrical signals to obtain at least one channel of data signals and applying a third stage cross-connecting to the at least one channel of data signals to obtain output data signals.

The present invention also provides a data cross-connect system, comprising: at least one first stage cross-connect module, at least two second stage cross-connect modules and at least one third stage cross-connect module;

the first stage cross-connect module comprises: a first stage cross-connect sub-module, a signal packaging sub-module, a first information generation sub-module and at least two transmitters;

the first information generation sub-module is configured to generate first information;

the first stage cross-connect sub-module is configured to apply a first stage cross-connecting to input data signals based on the first information generated by the first information generation sub-module to obtain at least two channels of data signals and sending the at least two channels of data signals to the signal packaging sub-module;

the signal packaging sub-module is configured to receive the at least two channels of data signals sent by the first stage cross-connect sub-module, packaging the at least two channels of data signals into at least two channels of electrical signals and sending the at least two channels of electrical signals to the at least two transmitters;

the at least two transmitters are configured to convert the at least two channels of electrical signals from the signal packaging sub-module into at least two channels of optical signals whose effective areas are aligned, and sending the at least two channels of optical signals to the at least two second stage cross-connect modules respectively;

the at least two second stage cross-connect modules are configured to apply a second stage cross-connecting to the at least two channels of optical signals sent by the at least two transmitters included in the at least one first stage cross-connect module, and sending the optical burst signals obtained after the cross-connecting to the at least one third stage cross-connect module;

the at least one third stage cross-connect module is configured to receive the optical burst signals sent by at least one of the at least two second stage cross-connect modules, converting the optical burst signals into electrical signals, unpackaging the electrical signals to obtain at least one channel of data signals and applying a third stage cross-connecting to the at least one channel of data signals to obtain output data signals.

The present invention also provides a data cross-connect method, comprising:

applying a first stage cross-connecting to input data signals by at least two first stage cross-connect modules respectively based on first information to obtain at least one channel of data signals respectively, and packaging respectively the at least one channel of data signals into at least one channel of electrical signals;

converting the at least one channel of packaged electrical signals into at least one channel of optical signals whose effective areas are aligned by at least one transmitter included in each of the at least two first stage cross-connect modules, sending the at least one channel of optical signals to at least one second stage cross-connect module so that the at least one second stage cross-connect module can apply a second stage cross-connecting to the at least one channel of optical signals sent by the at least one transmitter included in each of the at least two first stage cross-connect modules and send the optical burst signals obtained after the cross-connecting to at least one third stage cross-connect module.

The present invention also provides a data cross-connect method, comprising:

applying a first stage cross-connecting to input data signals by at least one first stage cross-connect module based on first information to obtain at least two channels of data signals, and packaging the at least two channels of data signals into at least two channels of electrical signals;

converting the at least two channels of packaged electrical signals into at least two channels of optical signals whose effective areas are aligned by at least two transmitters included in the at least one first stage cross-connect module, sending the at least two channels of optical signals to at least two second stage cross-connect modules so that the at least two cross-connect modules can apply a second stage cross-connecting to the at least two channels of optical signals sent by the at least two transmitters included in the at least one first stage cross-connect module and send the optical burst signals obtained after the cross-connecting to at least one third stage cross-connect module.

In the embodiments of the present invention, data signals are packaged into electrical signals by the signal packaging sub-module and the electrical signals are further converted into optical signals whose effective areas are aligned, and sent to the second stage cross-connect module by the transmitter. The present invention provides interconnection between sub-racks at a high rate and thus can reduce the number of interconnecting optical fibers and the connectors of the optical fibers, improve reliability and maintainability and further reduce the difficulty in design; in addition, since the second stage cross-connect module applies cross-connecting to the optical signals sent by the transmitter directly in the optical layer, the number of cross-connect subracks can be reduced and the size and power consumption of cross-connect subracks can also be reduced.

BRIEF DESCRIPTION OF DRAWINGS

A brief description is given herein to the accompanying drawings needed in the description of the embodiments of the present invention or in the description of the prior art in order to make the technical schemes of the embodiment of the present invention or of the prior art more apparent. Obviously the drawings described below are some of the embodiments of the present invention and those skilled in the art may achieve other drawings based on the accompanying drawings herein without inventive steps.

DESCRIPTION OF EMBODIMENTS

A further clear and complete description of technical solution in the embodiments of the present invention is hereinafter given to the present invention with reference to accompanying drawings so as to make the objectives, technical solution and merits of the embodiments of the present invention more apparent; obviously the embodiments to be described are only a part, but not all of the embodiments of the present invention. And all of the other embodiments achieved by those skilled in the art based on the embodiments of the present invention without inventive step should fall in the protection scope of the present invention.

Figure 1:
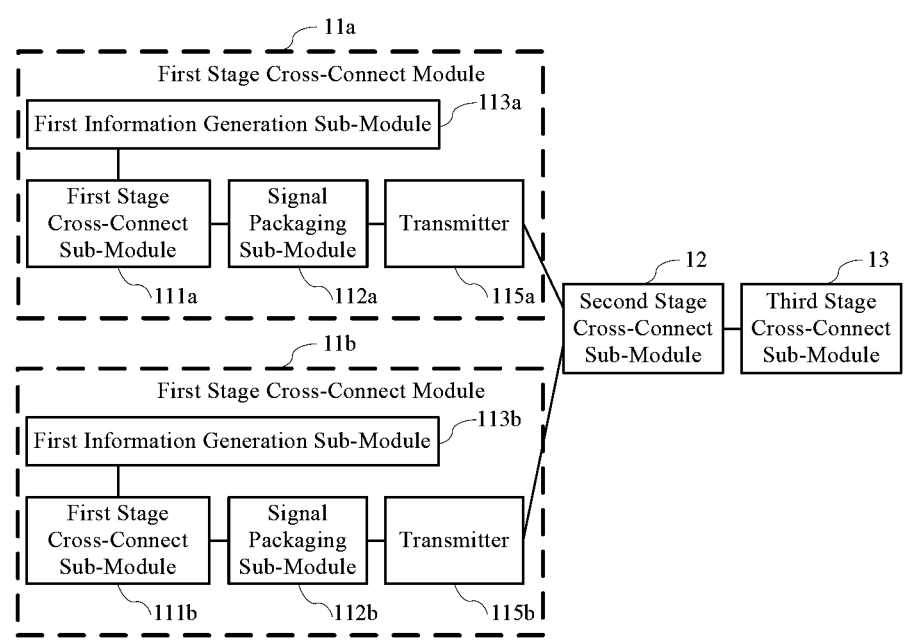
FIG. 1 is a schematic diagram illustrating the structure of an embodiment of a data cross-connect system in accordance with the present invention.

FIG. 1 is a schematic diagram illustrating the structure of an embodiment of a data cross-connect system in accordance with the present invention. As shown in FIG. 1, the data cross-connect system may comprise: at least two First Stage Cross-Connect Modules 11, at least one Second Stage Cross-Connect Module 12 and at least one Third Stage Cross-Connect Module 13;

wherein the First Stage Cross-Connect Module 11 may further comprise: a First Stage Cross-Connect Sub-Module 111, a Signal Packaging Sub-Module 112, a First Information Generation Sub-Module 113 and at least one Transmitter 115;

the First Information Generation Sub-Module 113 is used for generating first information;

the First Stage Cross-Connect Sub-Module 111 is used for applying a first stage cross-connecting to input data signals based on the first information generated by the First Information Generation Sub-Module 113 to obtain at least one channel of data signals and sending the at least one channel of data signals to the Signal Packaging Sub-Module 112;

the Signal Packaging Sub-Module 112 is used for receiving the at least one channel of data signals from the First Stage Cross-Connect Sub-Module 111, packaging the at least one channel of data signals into at least one channel of electrical signals and sending the at least one channel of electrical signals to the at least one Transmitter 115;

the at least one Transmitter 115 is used for converting the at least one channel of electrical signals from the Signal Packaging Sub-Module 112 into at least one channel of optical signals whose effective areas are aligned, and sending the at least one channel of optical signals to the at least one Second Stage Cross-Connect Module 12; and in this embodiment, the one channel of optical signals are optical signals sent by one Transmitter 115;

the at least one Second Stage Cross-Connect Module 12 is used for applying a second stage cross-connecting to the at least one channel of optical signals from the at least one Transmitter 115 included in each of the at least two First Stage Cross-Connect Modules 11 respectively, and sending the optical burst signals obtained after the cross-connecting to the at least one Third Stage Cross-Connect Module 13;

the at least one Third Stage Cross-Connect Module 13 is used for receiving the optical burst signals from the at least one Second Stage Cross-Connect Module 12, converting the above-described optical burst signals into electrical signals, unpackaging the electrical signals to obtain at least one channel of data signals and applying a third stage cross-connecting to the at least one channel of data signals to obtain output data signals.

As shown in FIG. 1, the present embodiment will be described hereinafter by taking the above-described data cross-connect system comprising two First Stage Cross-Connect Modules 11, one Second Stage Cross-Connect Module 12, one Third Stage Cross-Connect Module 13 and one Transmitter 115 included in each of the two First Stage Cross-Connect Modules 11 as an example. Wherein the above-described two First Stage Cross-Connect Modules 11 are denoted as First Stage Cross-Connect Module 11a and First Stage Cross-Connect Module 11b; the First Stage Cross-Connect Module 11a further comprises a First Stage Cross-Connect Sub-Module 111a, a Signal Packaging Sub-Module 112a, a First Information Generation Sub-Module 113a and a Transmitter 115a; the First Stage Cross-Connect Module 11b further comprises a First Stage Cross-Connect Sub-Module 111b, a Signal Packaging Sub-Module 112b, a First Information Generation Sub-Module 113b and a Transmitter 115b.

To be specific, upon receipt of input data signals, the First Stage Cross-Connect Sub-Module 111a applies the first stage cross-connecting to the input data signals based on the first information generated by the First Information Generation Sub-Module 113a to obtain a channel of data signals and sends the data signals to the Signal Packaging Sub-Module 112a; the Signal Packaging Sub-Module 112a packages the data signals into a channel of electrical signals and sends the electrical signals to the Transmitter 115a; then the Transmitter 115a converts the electrical signals into a channel of optical signals whose effective areas are aligned, and sends the optical signals to the Second Stage Cross-Connect Module 12.

Similarly, upon receipt of input data signals, the First Stage Cross-Connect Sub-Module 111b applies the first stage cross-connecting to the input data signals based on the first information generated by the First Information Generation Sub-Module 113b to obtain a channel of data signals and sends the data signals to the Signal Packaging Sub-Module 112b; the Signal Packaging Sub-Module 112b packages the data signals into a channel of electrical signals and sends the electrical signals to the Transmitter 115b; then the Transmitter 115b converts the electrical signals into a channel of optical signals whose effective areas are aligned, and sends the optical signals to the Second Stage Cross-Connect Module 12.

Upon receipt of the optical signals sent by the Transmitter 115a and Transmitter 115b respectively, the Second Stage Cross-Connect Module 12 applies the second stage cross-connecting to the one channel of optical signals from the Transmitter 115a and Transmitter 115b respectively, and sends the optical burst signals obtained after the cross-connecting to the Third Stage Cross-Connect Module 13.

The Third Stage Cross-Connect Module 13 converts the received optical burst signals into electrical signals, unpackages the electrical signals to obtain at least one channel of data signals and applies the third cross-connecting to the at least one channel of data signals to obtain output data signals.

When the data cross-connect system described above is applied to a cluster cross-connect system, the First Information Generation Sub-Module 113 is a first cross-connect configuration information generation sub-module and the first information generated by the First Information Generation Sub-Module 113 is the first cross-connect configuration information; for multi-stage cross-connecting, modification of the first cross-connect configuration information may need to be achieved through the interaction of multiple first cross-connect configuration information generation sub-modules, hence bus is needed between the multiple first cross-connect configuration information generation sub-modules for information communication, i.e., the first cross-connect configuration information generation sub-modules in different First Stage Cross-Connect Modules 11 respectively need to be connected to one another, e.g., the First Information Generation Sub-Module 113a and the First Information Generation Sub-Module 113b need to be connected to each other and the connection is not shown in FIG. 1. In practical application, the data cross-connect system usually uses Embedded Control Channel (ECC) for the interaction on the first cross-connect configuration information.

When the data cross-connect system described above is applied to an all-optical switching network, the First Information Generation Sub-Module 113 is a first scheduling information generation sub-module and the first information generated by the First Information Generation Sub-Module 113 is the first scheduling information, yet no interaction is needed between different first scheduling information generation sub-modules.

It should be noted that the terms "first" and "second" are used in the embodiments of the present invention just for the convenience of description and are not used for identifying the order, performance ranking and/or priority ranking of the related components. The terms "first" and "second" will be used in the same way hereafter.

The data cross-connect system described above provides interconnection between subracks at a high rate and thus reduces the number of interconnecting optical fibers and the connectors of the interconnecting optical fibers, improves reliability and maintainability and further reduces the difficulty in design; in addition, since the Second Stage Cross-Connect Module 12 applies cross-connecting to the optical signals from the Transmitter 115 directly in the optical layer, the number of cross-connect subracks can be reduced and the size and power consumption of cross-connect subracks can also be reduced.

Figure 2:
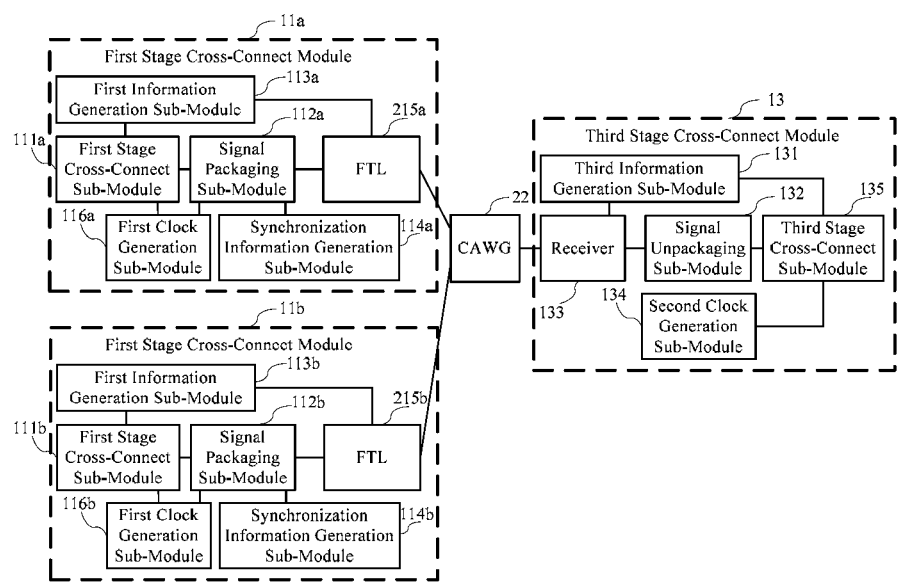
FIG. 2 is a schematic diagram illustrating the structure of another embodiment of a data cross-connect system in accordance with the present invention.

FIG. 2 is a schematic diagram illustrating the structure of another embodiment of a data cross-connect system in accordance with the present invention; the difference between the data cross-connect system shown in FIG. 1 and the data cross-connect system in the embodiment shown in FIG. 2 is that the above-described First Stage Cross-Connect Module 11 in the data cross-connect system of the present embodiment may further comprise:

a Synchronization Information Generation Sub-Module 114, used for generating synchronization information and sending the synchronization information to the Signal Packaging Sub-Module 112;

a First Clock Generation Sub-Module 116, used for generating first clock signal and sending the first clock signal to the Signal Packaging Sub-Module 112 and/or First Stage Cross-Connect Sub-Module 111;

a Signal Packaging Sub-Module 112, used for packaging at least one channel of data signals into at least one channel of electrical signals based on the synchronization information generated by the Synchronization Information Generation Sub-Module 114 and the first clock signal generated by the First Clock Generation Sub-Module 116; and a First Stage Cross-Connect Sub-Module 111, specifically used for applying the first stage cross-connecting to input data signals so as to obtain at least one channel of data signals based on the first information generated by First Information Generation Sub-Module 113 and the first clock signal generated by the First Clock Generation Sub-Module 116.

In the present embodiment, the Third Stage Cross-Connect Module 13 may comprise: a Third Information Generation Sub-Module 131, a Signal Unpackaging Sub-Module 132, at least one Receiver 133 and a Third Stage Cross-Connect Sub-Module 135, the at least one Receiver 133 is used for receiving optical burst signals sent by at least one Second Stage Cross-Connect Module 12, converting the above-described optical burst signals into electrical signals and sending the above-described electrical signals to the Signal Unpackaging Sub-Module 132;

the Signal Unpackaging Sub-Module 132 is used for unpackaging the electrical signals sent by the at least one Receiver 133 to obtain at least one channel of data signals;

the Third Information Generation Sub-Module 131 is used for generating third information; and the Third Stage Cross-Connect Sub-Module 135 is used for applying, based on the third information generated by the Third Information Generation Sub-Module 131, a third stage cross-connecting to the at least one channel of data signals obtained by the Signal Unpackaging Sub-Module 132 so as to obtain output data signals.

Furthermore, the Third Stage Cross-Connect Module 13 may also comprise: a Second Clock Generation Sub-Module 134, used for generating a second clock signal and sending the second clock signal to the Signal Unpackaging Sub-Module 132 and/or the Third Stage Cross-Connect Sub-Module 135;

the Signal Unpackaging Sub-Module 132, used for unpackaging, based on a second clock signal generated by the Second Clock Generation Sub-Module 134, the electrical signals sent by the at least one Receiver 133 to obtain at least one channel of data signals; and the Third Stage Cross-Connect Sub-Module 135, used for applying, based on the third information generated by the Third Information Generation Sub-Module 131 and the second clock signal generated by the Second Clock Generation Sub-Module 134, the third stage cross-connecting to the at least one channel of data signals obtained by the Signal Unpackaging Sub-Module 132 so as to obtain output data signals.

In the present embodiment, the transmitter is a fast wavelength tunable transmitter module, e.g., a Fast Tunable Laser (FTL) 215, the second stage cross-connect module is a Cyclic Arrayed Waveguide Grating (CAWG) 22 and the optical signals are optical burst signals.

The at least one FTL 215 is used for converting the at least one channel of electrical signals packaged by the Signal Packaging Sub-Module 112 into at least one channel of optical burst signals whose effective areas are aligned, and sending the above-described at least one channel of optical burst signals to the at least one CAWG 22 on corresponding wavelength based on the first information generated by the First Information Generation Sub-Module 113. In the present embodiment, the one channel of optical burst signals are optical burst signals sent by one FTL 215.

That is, the FTL and CAWG are used in the present embodiment for cross-connecting.

Figure 3:
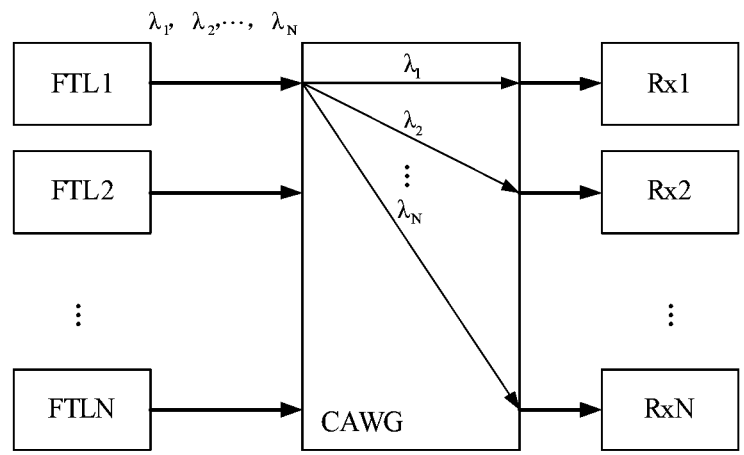
FIG. 3 is a schematic diagram illustrating the working principle of signal switching by a FTL plus CAWG in accordance with the present invention.

The primary feature of a CAWG is that signals of different wavelengths inputted via a same input port can be outputted via different output ports. FIG. 3 is a schematic diagram illustrating the working principle of signal switching by a FTL plus CAWG in accordance with the present invention. In FIG. 3, FTL1, FTL2, . . . FTLN are N transmitters, and Rx1, Rx2, . . . RxN are N receivers, wherein N is a positive integer larger than or equal to 2. As shown in FIG. 3, take FTL1 as an example, FTL1 sends different signals with the respective corresponding wavelengths to the CAWG, and after passing through the CAWG, the signals sent by the FTL1 can be outputted via different output ports and be received respectively by N receivers Rx1, Rx2, . . . Ran.

As shown in FIG. 2, the present embodiment will be described hereinafter by taking the above-described data cross-connect system comprising two First Stage Cross-Connect Modules 11, one CAWG 22, one Third Stage Cross-Connect Module 13, one FTL 215 included in each of the two First Stage Cross-Connect Modules 11 and one Receiver 133 included in the Third Stage Cross-Connect Module 13 as an example. Wherein the above-described two First Stage Cross-Connect Modules 11 are denoted as First Stage Cross-Connect Module 11a and First Stage Cross-Connect Module 11b; the First Stage Cross-Connect Module 11a comprises: a First Stage Cross-Connect Sub-Module 111a, a Signal Packaging Sub-Module 112a, a First Information Generation Sub-Module 113a, a Synchronization Information Generation Sub-Module 114a, a FTL 215a and a First Clock Generation Module 116a; the First Stage Cross-Connect Module 11b comprises: a First Stage Cross-Connect Sub-Module 111b, a Signal Packaging Sub-Module 112b, a First Information Generation Sub-Module 113b, a Synchronization Information Generation Sub-Module 114b,a FTL 215b and First Clock Generation Module 116b; and the Third Stage Cross-Connect Module 13 further comprises: a Third Information Generation Sub-Module 131, a Signal Unpackaging Sub-Module 132, Receiver 133, a Second Clock Generation Sub-Module 134 and a Third Stage Cross-Connect Sub-Module 135. In specific, upon receipt of input data signals, the First Stage Cross-Connect Sub-Module 111a applies first stage cross-connecting to the input data signals based on the first information generated by the First Information Generation Sub-Module 113a so as to obtain a channel of data signals, and sends the above-described one channel of data signals to the Signal Packaging Sub-Module 112a; the Signal Packaging Sub-Module 112a packages the above-described one channel of data signals into a channel of electrical signals based on the synchronization information generated by the Synchronization Information Generation Sub-Module 114a and the first clock signal generated by the First Clock Generation Module 116a and sends the above-described one channel of electrical signals to the FTL 215a; then the FTL 215a converts the above-described one channel of electrical signals into a channel of optical burst signals whose effective areas are aligned, and sends the above-described one channel of optical burst signals on the first wavelength to the CAWG 22 based on the first information generated by the First Information Generation Sub-Module 113a.

Similarly, upon receipt of input data signals, the First Stage Cross-Connect Sub-Module 111b applies first stage cross-connecting to the input data signals based on the first information generated by the First Information Generation Sub-Module 113b so as to obtain a channel of data signals, and sends the above-described one channel of data signals to the Signal Packaging Sub-Module 112b; the Signal Packaging Sub-Module 112b packages the above-described one channel of data signals into a channel of electrical signals based on the synchronization information generated by the Synchronization Information Generation Sub-Module 114b and the first clock signal generated by the First Clock Generation Module 116b and sends the channel of electrical signals to the FTL 215b; then the FTL 215b converts the above-described one channel of electrical signals into a channel of optical burst signals whose effective areas are aligned, and sends the channel of optical burst signals on the second wavelength to the CAWG 22 based on the first information generated by the First Information Generation Sub-Module 113b. The first wavelength and the second wavelength may be the same or different, because the FTL 215a and the FTL 215b are connected to different ports of the CAWG 22 and, based on the working principle of the CAWG, different FTLs may choose either the same or different wavelengths.

Upon receipts of the one channel of optical burst signals from the FTL 215a and the FTL 215b respectively, the CAWG 22 sends the one channel of optical burst signals sent by the FTL 215a and the FTL 215b respectively to the Receiver 133 in the Third Stage Cross-Connect Module 13.

Upon receipt of the optical burst signals, the Receiver 133 converts the above-described optical burst signals into electrical signals and sends the above-described electrical signals to the Signal Unpackaging Sub-Module 132; the Signal Unpackaging Sub-Module 132 unpackages the electrical signals from the Receiver 133 based on the second clock signal generated by the Second Clock Generation Sub-Module 134 so as to obtain at least one channel of data signals; then the Third Stage Cross-Connect Sub-Module 135 applies the third stage cross-connecting to the at least one channel of data signals obtained by the Signal Unpackaging Sub-Module 132 based on the third information generated by the Third Information Generation Sub-Module 131 and the second clock signal generated by the Second Clock Generation Sub-Module 134 so as to obtain output data signals.

In the present embodiment, the interval areas or ineffective areas of the optical burst signals can be used to absorb the frequency difference of different clocks, hence the first clock signals generated by different First Clock Generation Modules 116 may be synchronized or not synchronized; similarly, the second clock signals generated by different Second Clock Generation Modules 134 respectively may also be synchronized or not synchronized, and there is no limitation on this in the embodiments of the present invention.

When the above-described data cross-connect system is applied to a cluster cross-connect system, the Synchronization Information Generation Sub-Module 114 is a frame header synchronization sub-module and the synchronization information generated by the Synchronization Information Generation Sub-Module 114 is frame header synchronization signal used primarily for aligning the effective areas of the optical signals from different transmitters in the data cross-connect system so as to let different transmitters send the optical signals in the same cycle. In simple applications, the frame headers of the optical signals from different transmitters can be aligned, therefore, if the length of the optical signals is fixed and uniformed and the length of the interval or ineffective areas is also fixed and unformed, the effective areas of the optical signals from different transmitters can be aligned. It should be noted that the frame headers of the optical signals from different transmitters may also be unaligned. For example, the difference between the signals equals the length of the optical signals plus integral multiples of the interval or ineffective area. In such circumstance, if the length of the optical signals is fixed and uniformed and the length of the interval or ineffective areas is also fixed and unformed, the effective areas of the optical signals from different transmitters can also be aligned. Obviously there may be other circumstances, for example, the lengths of the optical signals are not uniformed or not fixed, or the like, but as long as such information is configured in advance, the effective areas of the optical signals from different transmitters can also be aligned. Therefore, the primary purpose of the Synchronization Information Generation Sub-Module 114 is aligning the effective areas of the optical signals from different transmitters and many particular control signals can be used, including but not limited to the alignment approaches described above. The cross-connecting of the optical signals can be achieved and high linear rate can be supported by transmitters only when the effective areas of the optical signals from different transmitters are aligned. In the present embodiment, every frame header synchronization sub-module sends frame header synchronization signals to the Signal Packaging Sub-Module 112 and the Signal Packaging Sub-Module 112 controls the alignment of the effective areas of optical signals from the transmitters connected to the Signal Packaging Sub-Module 112 based on the above-described frame header synchronization signals. Different frame header synchronization sub-modules also need to align and synchronize their respective outputted frame header synchronization signals, as shown in FIG. 2, the Synchronization Information Generation Sub-Module 114a and Synchronization Information Generation Sub-Module 114b are needed to be connected to each other and, particularly, the frame header synchronization signals outputted from different frame header synchronization sub-modules can be aligned and synchronized through tracking, e.g., using tree-like tracking manner. In simple circumstances, a primary module can be chosen from all frame header synchronization sub-modules and all the frame header synchronization sub-modules except the one chosen as the primary module track and lock on the frame header synchronization signals outputted from the primary module so that the frame header synchronization signals outputted from different frame header synchronization sub-modules to the Signal Packaging Sub-Module 112 are aligned and synchronized. Obviously different frame header synchronization sub-modules may also just synchronize the frame header synchronization signals without aligning such signals, and in such circumstances a scheduling algorithm is needed for adaptation according to the location difference between the frame headers of difference frame header synchronization sub-modules.

In addition, when the data cross-connect system described above is applied to a cluster cross-connect system, the Third Information Generation Sub-Module 131 is a third cross-connect configuration information generation sub-module and the third information generated by the Third Information Generation Sub-Module 131 is third cross-connect configuration information; for multi-stage cross-connecting, modification of the third cross-connect configuration information may need to be achieved through the interaction of multiple third cross-connect configuration information generation sub-modules, hence bus is needed between the multiple third cross-connect configuration information generation sub-modules for information communication, i.e., the third cross-connect configuration information generation sub-modules in different Third Stage Cross-Connect Modules 13 need to be connected to one another, and the connection is not shown in FIG. 2. In practical application, the data cross-connect system usually uses ECC for the interaction on the third cross-connect configuration information.

When the data cross-connect system described above is applied to an all-optical switching network, the Third Information Generation Sub-Module 131 is a third scheduling information generation sub-module and the third information generated by the Third Information Generation Sub-Module 131 is third scheduling information, yet no interaction is needed between different third scheduling information generation sub-modules. In addition, when the data cross-connect system described above is applied to an all-optical switching network, the Synchronization Information Generation Sub-Module 114 is a scheduling cycle synchronization sub-module and the synchronization information generated by the Synchronization Information Generation Sub-Module 114 is a scheduling cycle synchronization signal, similarly, different scheduling cycle synchronization sub-modules also need to synchronize and align the scheduling cycle synchronization signals with one another, as shown in FIG. 2, the Synchronization Information Generation Sub-Module 114a and Synchronization Information Generation Sub-Module 114b is needed to be connected to each other.

In the above-described data cross-connect system, the FTL 215 can send the above-described optical burst signals to the CAWG 22 at a rate no lower than that of input data signals. Since the subracks are interconnected at a comparatively high rate, the number of interconnecting optical fibers and the connectors of such interconnecting optical fibers can be reduced, the system reliability and maintainability can be improved and the difficulty in design can be reduced; in addition, since the cross-connect subrack consists of the CAWG 22, the cross-connect subrack can apply cross-connecting directly in the optical layer, the number of cross-connect subracks can be reduced and the size and power consumption of cross-connect subracks can also be reduced.

In another embodiment of the data cross-connect system of the present invention, compared with the data cross-connect system shown in the FIG. 2, is different in that the Second Stage Cross-Connect Module 12 in the data cross-connect system of the present invention may further comprise: at least two First Space Division Optical Cross-Connect Sub-Modules 121, at least one CAWG 122, at least one Second Space Division Optical Cross-Connect Sub-Module 123 and a Second Information Generation Sub-Module 124.

In this embodiment, at least one FTL 215 is used for converting the at least one channel of electrical signals packaged by the Signal Packaging Sub-Module 112 into at least one channel of optical burst signals whose effective areas are aligned, and sending the above-described at least one channel of optical burst signals to the at least two First Space Division Optical Cross-Connect Sub-Modules 121 on corresponding wavelength respectively based on the first information generated by the First Information Generation Sub-Module 113;

the Second Information Generation Sub-Module 124 is used for generating second information; and the at least two First Space Division Optical Cross-Connect Sub-Modules 121 are used for sending the at least one channel of optical burst signals from the at least one FTL 215 included in each of the at least two First Stage Cross-Connect Modules 11 respectively to at least one CAWG 122 based on the second information generated by the Second Information Generation Sub-Module 124;

the at least one CAWG 122 is used for sending the optical burst signals from the at least two First Space Division Optical Cross-Connect Sub-Modules 121 to the at least one Second Space Division Optical Cross-Connect Sub-Module 123; and the at least one Second Space Division Optical Cross-Connect Sub-Module 123 is used for sending the optical burst signals from the at least one CAWG 122 to the at least one Third Stage Cross-Connect Module 13 based on the second information generated by the Second Information Generation Sub-Module 124.

Figure 4:
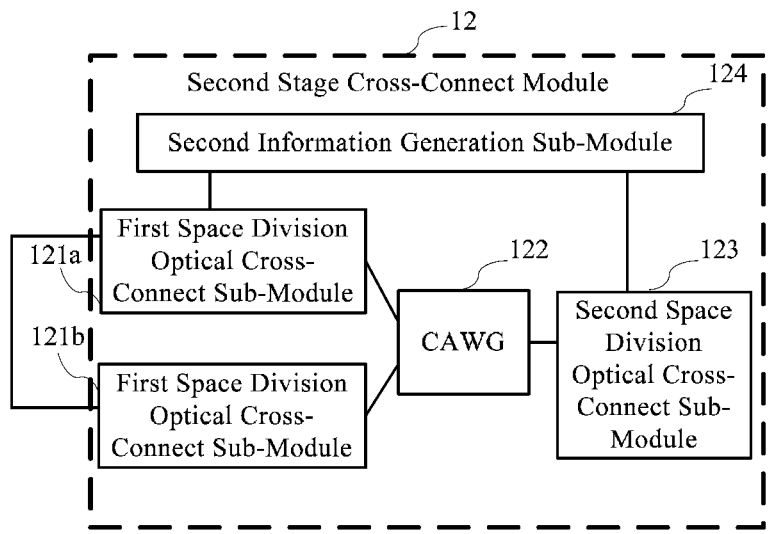
FIG. 4 is a schematic diagram illustrating the structure of an embodiment of a second stage cross-connect module in accordance with the present invention.

FIG. 4 is a schematic diagram illustrating the structure of an embodiment of a second stage cross-connect module in accordance with the present invention. As shown in FIG. 4, this embodiment will be described hereinafter by taking the above-described Second Stage Cross-Connect Module 12 which comprises two First Space Division Optical Cross-Connect Sub-Modules 121, one CAWG 122, one Second Space Division Optical Cross-Connect Sub-Module 123 and one Second Information Generation Sub-Module 124 as an example. The two First Space Division Optical Cross-Connect Sub-Modules 121 are identified as First Space Division Optical Cross-Connect Sub-Module 121a and First Space Division Optical Cross-Connect Sub-Module 121b.

To be specific, the FTL 215a converts one channel of electrical signals packaged by the Signal Packaging Sub-Module 112a into one channel of optical burst signals whose effective areas are aligned, and sends the above-described one channel of optical burst signals to the First Space Division Optical Cross-Connect Sub-Module 121a on the first wavelength based on the first information generated by the First Information Generation Sub-Module 113a;

upon receipt of the optical burst signals from the FTL 215a, the First Space Division Optical Cross-Connect Sub-Module 121a sends the above-described one channel of optical burst signals to the CAWG 122 based on the second information generated by the Second Information Generation Sub-Module 124;

similarly, the FTL 215b converts one channel of electrical signals packaged by the Signal Packaging Sub-Module 112b into one channel of optical burst signals whose effective areas are aligned, and sends the above-described one channel of optical burst signals to the First Space Division Optical Cross-Connect Sub-Module 121b on the second wavelength based on the first information generated by the First Information Generation Sub-Module 113b; wherein the first wavelength and the second wavelength may be the same or different;

upon receipt of the one channel of optical burst signals from the FTL 215b, the First Space Division Optical Cross-Connect Sub-Module 121b sends the above-described one channel of optical burst signals to the CAWG 122 based on the second information generated by the Second Information Generation Sub-Module 124;

upon receipt of the one channel of optical burst signals from the First Space Division Optical Cross-Connect Sub-Module 121a and the First Space Division Optical Cross-Connect Sub-Module 121b respectively, the CAWG 122 sends the above-described optical burst signals to the Second Space Division Optical Cross-Connect Sub-Module 123 and the Second Space Division Optical Cross-Connect Sub-Module 123 sends the above-described optical burst signals to the Receiver 133 in the Third Stage Cross-Connect Module 13 based on the second information generated by the Second Information Generation Sub-Module 124. The steps afterwards are given in the description of the embodiment shown in FIG. 2 and will be not described repeatedly herein.

Figure 5:
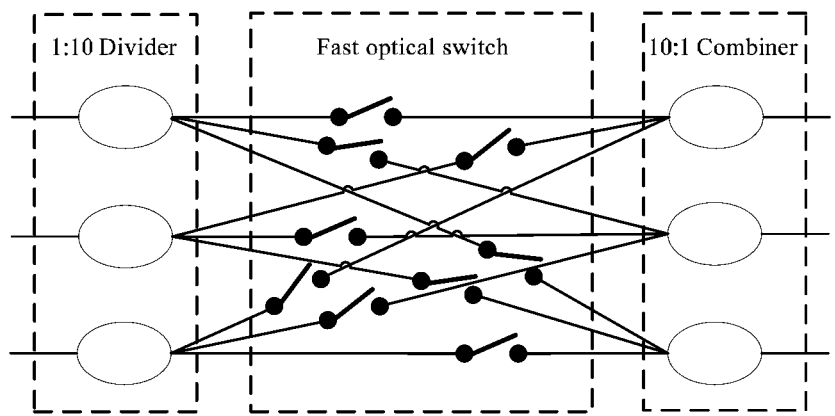
FIG. 5 is a schematic diagram illustrating an embodiment of a space division optical cross-connect sub-module in accordance with the present invention.

In practical applications, the above-described First Space Division Optical Cross-Connect Sub-Module 121 and the Second Space Division Optical Cross-Connect Sub-Module 123 can be built by using a fast optical switch array. FIG. 5 shows an example of implementing by a 10×10 space division optical cross-connect module, i.e., FIG. 5 is a schematic diagram illustrating an embodiment of a space division optical cross-connect sub-module in accordance with the present invention. Both the First Space Division Optical Cross-Connect Sub-Module 121 and the Second Space Division Optical Cross-Connect Sub-Module 123 in FIG. 4 can be realized through the approach provided in FIG. 5.

As shown in FIG. 5, a 10×10 space division optical cross-connect sub-module may consist of a hundred 1:1 fast optical switches, ten 1:10 dividers and ten 10:1 combiners. Obviously the embodiments of the present invention is not limited to such embodiment, the space division optical cross-connect sub-module may also consist of multi-level cascade of 1:2 optical switches and the present invention does not limit the approach for achieving the space division optical cross-connect sub-module. However, a space division optical cross-connect sub-module consisting of optical switch array can simplify the process of the second stage cross-connecting.

Yet another embodiment of the data cross-connect system in accordance with the present invention, compared with the data cross-connect system shown in the FIG. 2, is different in that the Second Stage Cross-Connect Module 12 may comprise: at least one First Space Division Optical Cross-Connect Sub-Module 125, at least two CAWGs 126, at least one Second Space Division Optical Cross-Connect Sub-Module 127 and a Second Information Generation Sub-Module 128.

In this embodiment, at least one FTL 215 is used for converting the at least one channel of electrical signals packaged by the Signal Packaging Sub-Module 112 into at least one channel of optical burst signals whose effective areas are aligned, and sending the above-described at least one channel of optical burst signals to the at least one First Space Division Optical Cross-Connect Sub-Module 125 on corresponding wavelength based on the first information generated by the First Information Generation Sub-Module 113;

the Second Information Generation Sub-Module 128 is used for generating second information; and the at least one First Space Division Optical Cross-Connect Sub-Module 125 is used for sending the at least one channel of optical burst signals from the at least one FTL 215 included in each of the at least two First Stage Cross-Connect Modules 11 respectively to at least two CAWGs 126 based on the second information generated by the Second Information Generation Sub-Module 128;

the at least two CAWGs 126 is used for sending the optical burst signals from the at least one First Space Division Optical Cross-Connect Sub-Module 125 to the at least one Second Space Division Optical Cross-Connect Sub-Module 127; and the at least one Second Space Division Optical Cross-Connect Sub-Module 127 is used for sending the optical burst signals from the at least two CAWGs 126 to the at least one Third Stage Cross-Connect Module 13 based on the second information generated by the Second Information Generation Sub-Module 128.

Figure 6:
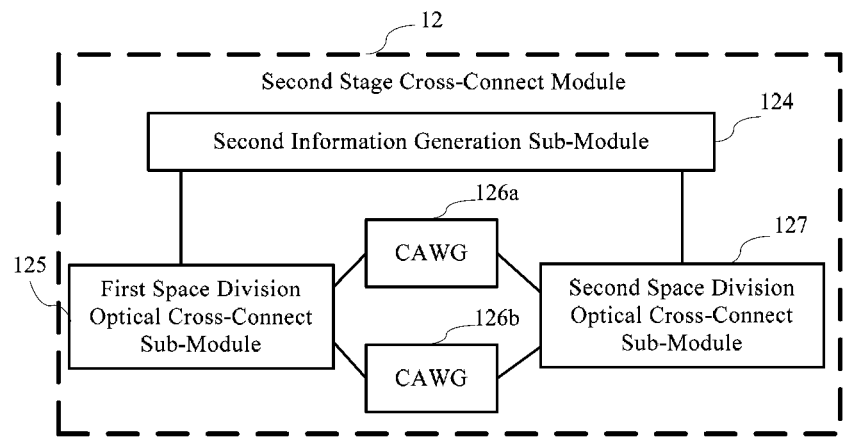
FIG. 6 is a schematic diagram illustrating the structure of another embodiment of a second stage cross-connect module in accordance with the present invention.

FIG. 6 is a schematic diagram illustrating the structure of another embodiment of a second stage cross-connect module in accordance with the present invention. As shown in FIG. 6, this embodiment will be described hereinafter by taking the above-described Second Stage Cross-Connect Module 12 which comprises one First Space Division Optical Cross-Connect Sub-Module 125, two CAWGs 126, one Second Space Division Optical Cross-Connect Sub-Module 127 and one Second Information Generation Sub-Module 128 as an example. The two CAWGs 126 are identified as CAWG 126a and CAWG 126b.

To be specific, the FTL 215a converts one channel of electrical signals packaged by the Signal Packaging Sub-Module 112a into one channel of optical burst signals whose effective areas are aligned, and sends the above-described one channel of optical burst signals to the First Space Division Optical Cross-Connect Sub-Module 125 on the first wavelength based on the first information generated by the First Information Generation Sub-Module 113a, the FTL 215b converts one channel of electrical signals packaged by the Signal Packaging Sub-Module 112b into one channel of optical burst signals whose effective areas are aligned, and sends the above-described one channel of optical burst signals to the First Space Division Optical Cross-Connect Sub-Module 125 on the second wavelength based on the first information generated by the First Information Generation Sub-Module 113b; wherein the first wavelength and the second wavelength may be the same or different;

the First Space Division Optical Cross-Connect Sub-Module 125 sends the optical burst signals from the FTL 215a and the FTL 215b respectively to the CAWG 126a and the CAWG 126b based on the second information generated by the Second Information Generation Sub-Module 128; and the CAWG 126a and the CAWG 126b send the optical burst signals from the First Space Division Optical Cross-Connect Sub-Module 125 to the Second Space Division Optical Cross-Connect Sub-Module 127. Then the Second Space Division Optical Cross-Connect Sub-Module 127 sends the optical burst signals from the CAWG 126a and the CAWG 126b to the Receiver 133 in the Third Cross-Connect Module 13 based on the second information generated by the Second Information Generation Sub-Module 128. The steps afterwards are given in the description of the embodiment shown in FIG. 2 and will be not described repeated herein.

In practical applications, the above-described First Space Division Optical Cross-Connect Sub-Module 125 and the Second Space Division Optical Cross-Connect Sub-Module 127 can be built by using fast optical switch array, e.g., through the approach provided in FIG. 5.

Figure 7:
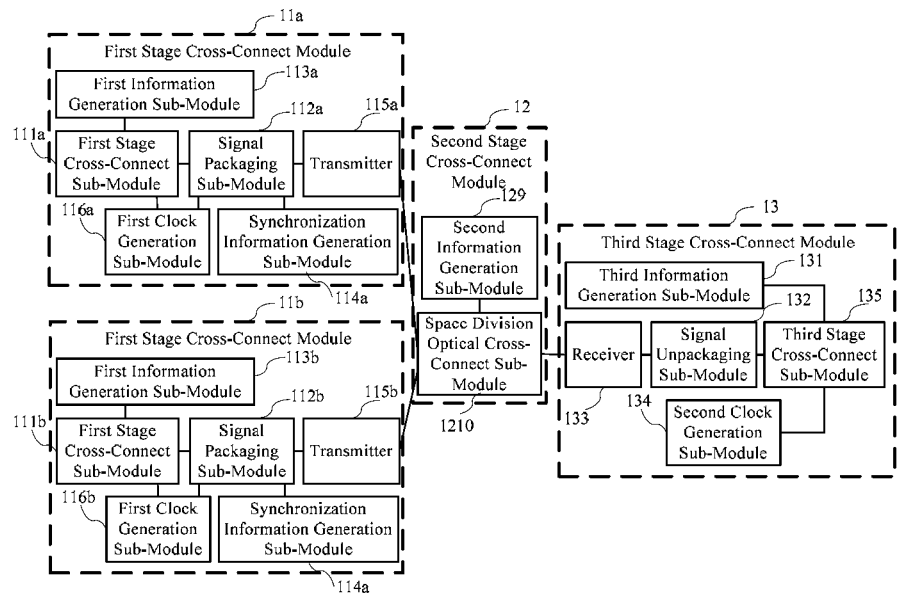
FIG. 7 is a schematic diagram illustrating the structure of yet another embodiment of a data cross-connect system in accordance with the present invention.

FIG. 7 is a schematic diagram illustrating the structure of yet another embodiment of a data cross-connect system of the present invention; comparing with the data cross-connect system shown in FIG. 1, the difference is that the above-described First Stage Cross-Connect Module 11 may further comprise:

a Synchronization Information Generation Sub-Module 114, used for generating synchronization information and sending the synchronization information to the Signal Packaging Sub-Module 112;

a First Clock Generation Sub-Module 116, used for generating a first clock signal and sending the first clock signal to the Signal Packaging Sub-Module 112 and/or First Stage Cross-Connect Sub-Module 111;

a Signal Packaging Sub-Module 112, used for packaging at least one channel of data signals into at least one channel of electrical signals based on the synchronization information generated by the Synchronization Information Generation Sub-Module 114 and the first clock signal generated by the First Clock Generation Sub-Module 116; and a First Stage Cross-Connect Sub-Module 111, specifically used for applying the first stage cross-connecting to input data signals so as to obtain at least one channel of data signals based on the first information generated by First Information Generation Sub-Module 113 and the first clock signal generated by the First Clock Generation Sub-Module 116.

In the data cross-connect system shown in this embodiment, the Second Cross-Connect Module 12 may also comprise: a Second Information Generation Sub-Module 129 and a Space Division Optical Cross-Connect Sub-Module 1210;

at least one Second Information Generation Sub-Module 129 is used for generating second information; and at least one Space Division Optical Cross-Connect Sub-Module 1210 is used for applying, based on the second information generated by the at least one Second Information Generation Sub-Module 129, the second stage cross-connecting to the at least one channel of continuous optical signals sent by at least one Transmitter 115 included in each of the at least two First Stage Cross-Connect Modules 11, and sending the optical burst signals obtained after the cross-connecting to at least one Third Stage Cross-Connect Module 13. In this embodiment, the one channel of continuous optical signals are continuous optical signals sent by one transmitter 115.

Figure 12A:
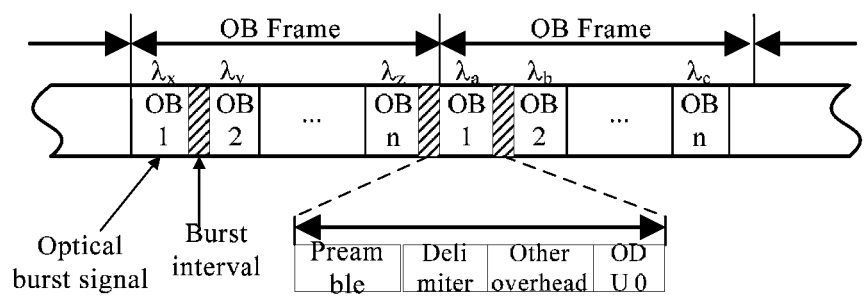
FIG. 12a is schematic diagram illustrating an embodiment of OB signal in accordance with the present invention.
Figure 12B:
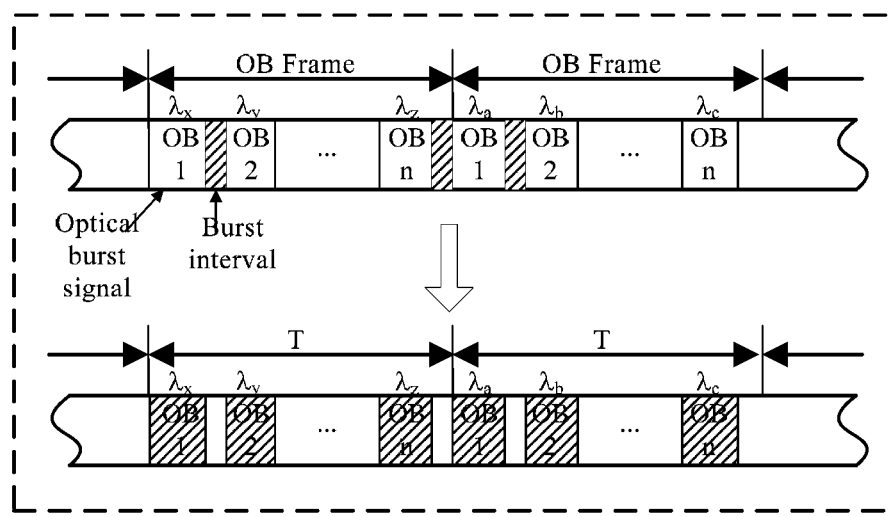
FIG. 12b is schematic diagram illustrating an embodiment of continuous optical signal in accordance with the present invention.

In this embodiment, the optical signals sent by the Transmitter 115 are continuous optical signals and FIG. 12b is a schematic diagram illustrating an embodiment of the continuous optical signals in accordance with the present invention. As shown in FIG. 12b, the difference between the continuous optical signals and the optical burst signals is that the burst internals between the optical burst signals in the continuous optical signals are padded with ineffective information (e.g., fixed pattern or preamble, etc.) and the optical switches in the Space Division Optical Cross-Connect Sub-Module 1210 need to switch in the ineffective areas so that the signals obtained by the Space Division Optical Cross-Connect Sub-Module 1210 after applying the second stage cross-connecting are optical burst signals.

The Third Stage Cross-Connect Module 13 may comprise: a Third Information Generation Sub-Module 131, a Signal Unpackaging Sub-Module 132, at least one Receiver 133 and a Third Stage Cross-Connect Sub-Module 135;

the at least one Receiver 133 is used for receiving the optical burst signals sent by the at least one Second Stage Cross-Connect Module 12, converting the above-described optical burst signals into electrical signals and sending the above-described electrical signals to the Signal Unpackaging Sub-Module 132;

the Signal Unpackaging Sub-Module 132 is used for unpackaging the electrical signals sent by the at least one Receiver 133 to obtain at least one channel of data signals;

the Third Information Generation Sub-Module 131 is used for generating third information; and the Third Stage Cross-Connect Sub-Module 135 is used for applying, based on the third information generated by the Third Information Generation Sub-Module 131, third stage cross-connecting to the at least one channel of data signals obtained by the Signal Unpackaging Sub-Module 132 so as to obtain output data signals.

Furthermore, the Third Stage Cross-Connect Module 13 may also comprise: a Second Clock Generation Sub-Module 134, used for generating a second clock signal and sending the second clock signal to the Signal Unpackaging Sub-Module 132 and/or the Third Stage Cross-Connect Sub-Module 135;

the Signal Unpackaging Sub-Module 132, specifically used for unpackaging, based on the second clock signal generated by the Second Clock Generation Sub-Module 134, the electrical signals sent by the at least one Receiver 133 to obtain at least one channel of data signals; and the Third Stage Cross-Connect Sub-Module 135, used for applying, based on the third information generated by the Third Information Generation Sub-Module 131 and the second clock signal generated by the Second Clock Generation Sub-Module 134, the third stage cross-connecting to the at least one channel of data signals obtained by the Signal Unpackaging Sub-Module 132 so as to obtain output data signals.

As shown in FIG. 7, this embodiment will be described hereinafter by taking the above-described data cross-connect system comprising two First Stage Cross-Connect Modules 11, one Second Stage Cross-Connect Module 12, one Third Stage Cross-Connect Module 13, one Transmitter 115 included in each First Stage Cross-Connect Module 11, and one Receive 133 included in each Third Stage Cross-Connect Module 13 as an example. Wherein the above-described two First Stage Cross-Connect Modules 11 are identified as First Stage Cross-Connect Module 11a and First Stage Cross-Connect Module 11b; the First Stage Cross-Connect Module 11a comprises a First Stage Cross-Connect Sub-Module 111a, a Signal Packaging Sub-Module 112a, a First Information Generation Sub-Module 113a, a Synchronization Information Generation Sub-Module 114a, a Transmitter 115a and a First Clock Generation Module 116a; the First Stage Cross-Connect Module 11b comprises a First Stage Cross-Connect Sub-Module 111b, a Signal Packaging Sub-Module 112b, a First Information Generation Sub-Module 113b, a Synchronization Information Generation Sub-Module 114b, a Transmitter 115b and a First Clock Generation Module 116b; the Second Stage Cross-Connect Module 12 comprises a Second Information Generation Sub-Module 129 and a Space Division Optical Cross-Connect Sub-Module 1210; and the Third Stage Cross-Connect Module 13 comprises a Third Information Generation Sub-Module 131, a Signal Unpackaging Sub-Module 132, a Receiver 133, a Second Clock Generation Sub-Module 134 and a Third Stage Cross-Connect Sub-Module 135.

In specific, upon receipt of input data signals, the First Stage Cross-Connect Sub-Module 111a applies first stage cross-connecting to the input data signals based on the first information generated by the First Information Generation Sub-Module 113a so as to obtain a channel of data signals and sends the above-described one channel of data signals to the Signal Packaging Sub-Module 112a; the Signal Packaging Sub-Module 112a then packages the above-described one channel of data signals into a channel of electrical signals based on the synchronization information generated by the Synchronization Information Generation Sub-Module 114a and the first clock signal generated by the First Clock Generation Module 116a and sends the above-described one channel of electrical signals to the Transmitter 115a; then the Transmitter 115a converts the above-described one channel of electrical signals into a channel of continuous optical signals whose effective areas are aligned, and sends the above-described one channel of continuous optical signals whose effective areas are aligned, to the Space Division Optical Cross-Connect Sub-Module 1210.

Similarly, upon receipt of input data signals, the First Stage Cross-Connect Sub-Module 111b applies first stage cross-connecting to the input data signals based on the first information generated by the First Information Generation Sub-Module 113b so as to obtain a channel of data signals and sends the above-described one channel of data signals to the Signal Packaging Sub-Module 112b; then the Signal Packaging Sub-Module 112b packages the above-described one channel of data signals into a channel of electrical signals based on the synchronization information generated by the Synchronization Information Generation Sub-Module 114b and the first clock signal generated by the First Clock Generation Module 116b and sends the above-described one channel of electrical signals to the Transmitter 115b; then the Transmitter 115b converts the above-described one channel of electrical signals into a channel of continuous optical signals whose effective areas are aligned, and sends the above-described one channel of continuous optical signals whose effective areas are aligned, to the Space Division Optical Cross-Connect Sub-Module 1210.

Then the Space Division Optical Cross-Connect Sub-Module 1210 applies the second stage cross-connecting to the continuous optical signals from the Transmitters 115a and the Transmitter 115b based on the second information generated by the Second Information Generation Sub-Module 129, and sends the optical burst signals obtained after the cross-connecting to the Receiver 133 in the Third Stage Cross-Connect Module 13 respectively.

The Receiver 133 then converts the above-described optical burst signals into electrical signals and sends the above-described electrical signals to the Signal Unpackaging Sub-Module 132; the Signal Unpackaging Sub-Module 132 unpackages the electrical signals from the Receiver 133 based on the second clock signal generated by the Second Clock Generation Sub-Module 134 so as to obtain at least one channel of data signals; then the Third Stage Cross-Connect Sub-Module 135 applies the third stage cross-connecting to the at least one channel of data signals from the Signal Unpackaging Sub-Module 132 based on the third information generated by the Third Information Generation Sub-Module 131 and the second clock signal generated by the Second Clock Generation Sub-Module 134 so as to obtain output data signals.

In the present embodiment, the ineffective areas of the optical signals can be used to absorb the frequency difference of different clocks, hence the first clock signals generated by different First Clock Generation Modules 116 respectively may be synchronized or not synchronized; similarly, the second clock signals generated by different Second Clock Generation Modules 134 respectively may also be synchronized or not synchronized, and there is no limitation on this in the embodiments of the present invention.

In this embodiment, the Transmitter 115 can be a colored optical interface, e.g., an optical interface in accordance with the wavelength standards of multi-channel optical systems such as a Wavelength Division Multiplexing (WDM) standards; the Transmitter 115 can also be a grey optical interface (i.e., white optical interface), e.g., an optical interface in accordance with the standards of intra-office systems such as the International Telecommunication Union Telecommunication Standardization Sector (ITU-T) G.693 Standard. When the Transmitter 115 is a grey optical interface, the Space Division Optical Cross-Connect Sub-Module 1210 can be achieved through the approach provided in FIG. 5; and when the Transmitter 115 is a colored optical interface, the Space Division Optical Cross-Connect Sub-Module 1210 can be achieved by using micro-ring based fast optical filter array.

When the above-described data cross-connect system is applied to a cluster cross-connect system, the Synchronization Information Generation Sub-Module 114 is a frame header synchronization sub-module and the synchronization information generated by the Synchronization Information Generation Sub-Module 114 is a frame header synchronization signal used primarily for aligning the effective areas of the optical signals from different transmitters in the data cross-connect system so as to let different transmitters send the optical signals in the same cycle. In simple applications, the frame headers of the optical signals from different transmitters can be aligned, thus if the length of the optical signals is fixed and uniformed and the length of the interval or ineffective areas is also fixed and unformed, the effective areas of the optical signals from different transmitters can be aligned. It should be noted that the frame headers of the optical signals from different transmitters may also be unaligned. For example, the difference equals the length of the optical signals plus integral multiples of the interval or ineffective area, in such circumstance, if the length of the optical signals is fixed and uniformed and the length of the interval or ineffective areas is also fixed and unformed, the effective areas of the optical signals from different transmitters can also be aligned. Obviously there may be other circumstances, for example, the lengths of the optical signals are not uniformed or not fixed or the like, but as long as such information is configured in advance, the effective areas of the optical signals from different transmitters can still be aligned. Therefore, the primary purpose the Synchronization Information Generation Sub-Module 114 is aligning the effective areas of the optical signals from different transmitters and many particular control signals can be used to achieve such purpose, including but not limited to the alignment approaches described above. The cross-connecting of the optical signals can be achieved and high linear rate can be supported by transmitters only when the effective areas of the optical signals from different transmitters are aligned. In this embodiment, every frame header synchronization sub-module sends frame header synchronization signals to the Signal Packaging Sub-Module 112 and the Signal Packaging Sub-Module 112 controls the alignment of the effective areas of optical signals from the transmitters connected to the Signal Packaging Sub-Module 112 based on the above-described frame header synchronization signals. Different frame header synchronization sub-modules also need to synchronously align their respective outputted frame header synchronization signals, as shown in FIG. 2, the Synchronization Information Generation Sub-Module 114*a* and Synchronization Information Generation Sub-Module 114*b* are needed to be connected to each other and, particularly, the frame header synchronization signals from different frame header synchronization sub-modules can be aligned and synchronized through tracking, e.g., using tree-like tracking manner. In simple applications, a primary module can be chosen from all frame header synchronization sub-modules and all the frame header synchronization sub-modules except the one chosen as the primary module should track and lock on the frame header synchronization signals outputted from the primary module so that synchronous alignment of the frame header synchronization signals from different frame header synchronization sub-modules to the Signal Packaging Sub-Module 112 are aligned and synchronized. Obviously different frame header synchronization sub-modules may also synchronize the frame header synchronization signals without aligning such signals, and in such circumstances a scheduling algorithm is needed for adaptation based on the location difference between the frame headers of difference frame header synchronization sub-modules.

In addition, when the data cross-connect system described above is applied to a cluster cross-connect system, the Second Information Generation Sub-Module 129 is a second cross-connect configuration information generation sub-module and the second information generated by the Second Information Generation Sub-Module 129 is second cross-connect configuration information; for multi-stage cross-connecting, modification of the second cross-connect configuration information may need to be achieved through the interaction of multiple second cross-connect configuration information generation sub-modules, hence bus is needed between the multiple second cross-connect configuration information generation sub-modules for information communication, i.e., the second cross-connect configuration information generation sub-modules in different Second Stage Cross-Connect Modules 12 need to be connected to one another, and the connection is not shown in FIG. 7. In practical application, the data cross-connect system usually uses ECC for the interaction on the second cross-connect configuration information.

In addition, when the data cross-connect system described above is applied to a cluster cross-connect system, the Third Information Generation Sub-Module 131 is a third cross-connect configuration information generation sub-module and the third information generated by the Third Information Generation Sub-Module 131 is third cross-connect configuration information; for multi-stage cross-connecting, modification of the third cross-connect configuration information may need to be achieved through the interaction of multiple third cross-connect configuration information generation sub-modules, hence bus is needed between the multiple third cross-connect configuration information generation sub-modules for information communication, i.e., the third cross-connect configuration information generation sub-modules in different Third Stage Cross-Connect Modules 13 respectively need to be connected to one another, and the connection is not shown in FIG. 7. In practical application, the data cross-connect system usually uses ECC for the interaction on the third cross-connect configuration information.

In addition, when the data cross-connect system described above is applied to an all-optical switching network, the Synchronization Information Generation Sub-Module 114 is a scheduling cycle synchronization sub-module and the synchronization information generated by the Synchronization Information Generation Sub-Module 114 is a scheduling cycle synchronization signal, similarly, different scheduling cycle synchronization sub-modules also need to synchronize and align the scheduling cycle synchronization signals with one another, as shown in FIG. 7, the Synchronization Information Generation Sub-Module 114*a* and Synchronization Information Generation Sub-Module 114*b* need to be connected to each other.

In addition, when the data cross-connect system described above is applied to an all-optical switching network, the Second Information Generation Sub-Module 129 is a second scheduling information generation sub-module and the second information generated by the Second Information Generation Sub-Module 129 is second scheduling information, yet no interaction is needed between different second scheduling information generation sub-modules. When the data cross-connect system described above is applied to an all-optical switching network, the Third Information Generation Sub-Module 131 is a third scheduling information generation sub-module and the third information generated by the Third Information Generation Sub-Module 131 is third scheduling information, yet no interaction is needed between different third scheduling information generation sub-modules.

In the data cross-connect system above, the Transmitter 115 can send the continuous optical signals to the Space Division Optical Cross-Connect Sub-Module 1210 at a rate no lower than that of corresponding input data signals. Since the subracks are interconnected at a comparatively high rate, the number of interconnecting optical fibers and the connectors of such interconnecting optical fibers can be reduced, the system reliability and maintainability can be improved and the difficulty in design can be reduced; in addition, since the cross-connect subrack consists of the Space Division Optical Cross-Connect Sub-Modules 1210, the cross-connect subrack can apply cross-connecting directly in the optical layer, the number of cross-connect subracks can be reduced and the size and power consumption of cross-connect subracks can also be reduced.

Figure 8:
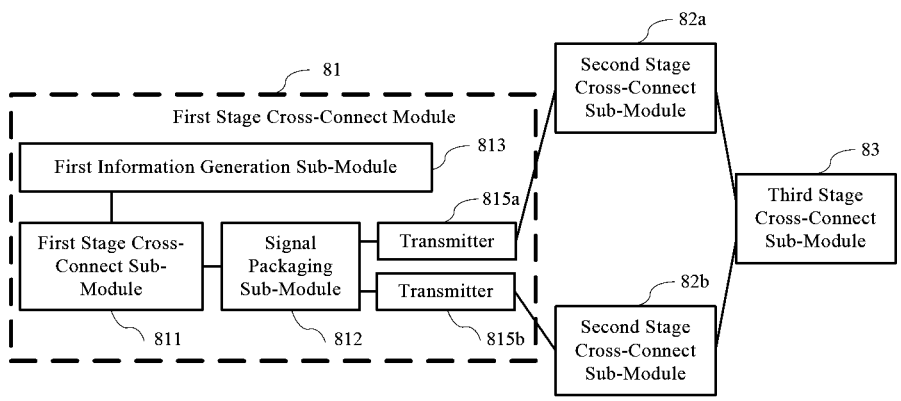
FIG. 8 is a schematic diagram illustrating the structure of yet another embodiment of a data cross-connect system in accordance with the present invention.

FIG. 8 is a schematic diagram illustrating the structure of another embodiment of a data cross-connect system in accordance with the present invention. As shown in FIG. 8, the data cross-connect system may comprise: at least one First Stage Cross-Connect Modules 81, at least two Second Stage Cross-Connect Modules 82 and at least one Third Stage Cross-Connect Module 83;

wherein the First Stage Cross-Connect Module 81 may further comprise: a First Stage Cross-Connect Sub-Module 811, a Signal Packaging Sub-Module 812, a First Information Generation Sub-Module 813 and at least two Transmitters 815;

the First Information Generation Sub-Module 813 is used for generating first information;

the First Stage Cross-Connect Sub-Module 811 is used for applying a first stage cross-connecting to input data signals based on the first information generated by the First Information Generation Sub-Module 813 to obtain at least two channels of data signals and sending the above-described at least two channels of data signals to the Signal Packaging Sub-Module 812;

the Signal Packaging Sub-Module 812 is used for receiving the at least two channels of data signals from the First Stage Cross-Connect Sub-Module 811, packaging the above-described at least two channels of data signals into at least two channels of electrical signals and sending the above-described at least two channels of electrical signals to the at least two Transmitters 815;

the at least two Transmitters 815 are used for converting the at least two channels of electrical signals packaged by the Signal Packaging Sub-Module 812 into at least two channels of optical signals whose effective areas are aligned, and sending the above-described at least two channels of optical signals to the at least two Second Stage Cross-Connect Modules 82 respectively; and in this embodiment, one channel of optical signals are optical signals sent from one Transmitter 815;

the at least two Second Stage Cross-Connect Modules 82 are used for applying a second stage cross-connecting to the at least two channels of optical signals from the at least two Transmitters 815 included in the at least one First Stage Cross-Connect Module 81, and sending the optical burst signals obtained after the cross-connecting to the at least one Third Stage Cross-Connect Module 83;

the at least one Third Stage Cross-Connect Module 83 is used for receiving the optical burst signals from at least one of the at least two Second Stage Cross-Connect Modules 82, converting the above-described optical burst signals into electrical signals, unpackaging the above-described electrical signals to obtain at least one channel of data signals and applying a third stage cross-connecting to the above-described at least one channel of data signals to obtain output data signals.

As shown in FIG. 8, the present embodiment will be described hereinafter by taking a data cross-connect system that comprises one First Stage Cross-Connect Module 81, two Second Stage Cross-Connect Modules 82, one Third Stage Cross-Connect Module 83 and two Transmitters 815 included in the First Stage Cross-Connect Modules 81 as an example. The two Second Stage Cross-Connect Modules 82 are denoted as Second Stage Cross-Connect Module 82a and Second Stage Cross-Connect Module 82b, and the two Transmitters 815 are denoted as Transmitter 815a and Transmitter 815b.

To be specific, upon receipt of input data signals, the First Stage Cross-Connect Sub-Module 811 applies the first stage cross-connecting to multiple channels of data signals based on the first information generated by the First Information Generation Sub-Module 813 to obtain two channels of data signals and sends the above-described two channels of data signals to the Signal Packaging Sub-Module 812; then the Signal Packaging Sub-Module 812 packages the above-described two channels of data signals into two channels of electrical signals and sends the above-described two channels of electrical signals to Transmitter 815a and Transmitter 815b respectively; then the Transmitter 815a converts the received electrical signals into optical signals whose effective areas are aligned, and sends the above-described optical signals to the Second Stage Cross-Connect Module 82a, similarly, the Transmitter 815b also converts the received electrical signals into optical signals whose effective areas are aligned, and sends the above-described optical signals to the Second Stage Cross-Connect Module 82b.

Second Stage Cross-Connect Module 82a and Second Stage Cross-Connect Module 82b then apply second stage cross-connecting to the received optical signals respectively and send the optical burst signals obtained after the cross-connecting to the Third Stage Cross-Connect Module 83.

The Third Stage Cross-Connect Module 83 converts the received optical burst signals into electrical signals, unpackages the electrical signals to obtain at least one channel of data signals and applies a third cross-connecting to the above-described at least one channel of data signals to obtain output data signals.

When the data cross-connect system described above is applied to a cluster cross-connect system, the First Information Generation Sub-Module 813 is a first cross-connect configuration information generation sub-module and the first information generated by the First Information Generation Sub-Module 813 is first cross-connect configuration information; for multi-stage cross-connecting, modification of the first cross-connect configuration information may need to be achieved through the interaction of multiple first cross-connect configuration information generation sub-modules, hence bus is needed between the multiple first cross-connect configuration information generation sub-modules for information communication, i.e., the first cross-connect configuration information generation sub-modules in different First Stage Cross-Connect Modules 81 respectively need to be connected to one another, and the connection is not shown in FIG. 8. In practical application, the data cross-connect system usually uses ECC for the interaction on the first cross-connect configuration information.

When the data cross-connect system described above is applied to an all-optical switching network, the First Information Generation Sub-Module 813 is a first scheduling information generation sub-module and the first information generated by the First Information Generation Sub-Module

813 is first scheduling information, yet no interaction is needed between different first scheduling information generation sub-modules.

The data cross-connect system described above provides interconnection between subracks at a high rate and thus reduces the number of interconnecting optical fibers and the connectors of the interconnecting optical fibers, improves reliability and maintainability and further reduces the difficulty in design; in addition, since the Second Stage Cross-Connect Module 82 applies cross-connecting to the optical signals from the Transmitter 815 directly in the optical layer, the number of cross-connect subracks can be reduced and the size and power consumption of cross-connect subracks can also be reduced.

Figure 9:
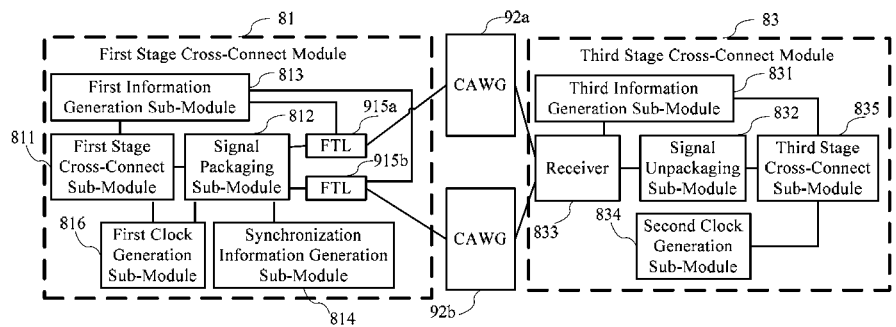
FIG. 9 is a schematic diagram illustrating the structure of yet another embodiment of a data cross-connect system in accordance with the present invention.

FIG. 9 is a schematic diagram illustrating the structure of yet another embodiment of a data cross-connect system of the present invention; the difference between the data cross-connect system shown in FIG. 9 and the data cross-connect system in the embodiment shown in FIG. 8 is that the First Stage Cross-Connect Module 81 in the data cross-connect system of the present embodiment may further comprise:

a Synchronization Information Generation Sub-Module 814, used for generating synchronization information and sending the synchronization information to the Signal Packaging Sub-Module 812;

a First Clock Generation Sub-Module 816, used for generating a first clock signal and sending the first clock signal to the Signal Packaging Sub-Module 812 and/or First Stage Cross-Connect Sub-Module 811;

a Signal Packaging Sub-Module 812, used for packaging at least two channels of data signals into at least two channels of electrical signals based on the synchronization information generated by the Synchronization Information Generation Sub-Module 814 and the first clock signal generated by the First Clock Generation Sub-Module 816; and a First Stage Cross-Connect Sub-Module 811, used for applying a first stage cross-connecting to input data signals so as to obtain at least two channels of data signals based on the first information generated by First Information Generation Sub-Module 813 and the first clock signal generated by the First Clock Generation Sub-Module 816.

In this embodiment, the Third Stage Cross-Connect Module 83 may comprise: a Third Information Generation Sub-Module 831, a Signal Unpackaging Sub-Module 832, at least one Receiver 833 and a Third Stage Cross-Connect Sub-Module 835, the at least one Receiver 833 is used for receiving optical burst signals sent by at least one of the at least two Second Stage Cross-Connect Modules 82, converting the above-described optical burst signals into electrical signals and sending the electrical signals to the Signal Unpackaging Sub-Module 832;

the Signal Unpackaging Sub-Module 832 is used for unpackaging the electrical signals sent by the at least one Receiver 833 to obtain at least one channel of data signals;

the Third Information Generation Sub-Module 831 is used for generating third information; and the Third Stage Cross-Connect Sub-Module 835 is used for applying, based on the third information generated by the Third Information Generation Sub-Module 831, a third stage cross-connecting to the at least one channel of data signals obtained by the Signal Unpackaging Sub-Module 832 so as to obtain output data signals.

Furthermore, the Third Stage Cross-Connect Module 83 may also comprise: a Second Clock Generation Sub-Module 834, used for generating a second clock signal and sending the second clock signal to the Signal Unpackaging Sub-Module 832 and/or the Third Stage Cross-Connect Sub-Module 835;

the Signal Unpackaging Sub-Module 832, used for unpackaging, based on the second clock signal generated by the Second Clock Generation Sub-Module 834, the electrical signals sent by the at least one Receiver 833 to obtain at least one channel of data signals; and the Third Stage Cross-Connect Sub-Module 835, used for applying, based on the third information generated by the Third Information Generation Sub-Module 831 and the second clock signal generated by the Second Clock Generation Sub-Module 834, the third stage cross-connecting to the at least one channel of data signals obtained by the Signal Unpackaging Sub-Module 832 so as to obtain output data signals.

In the present embodiment, the transmitter is a fast wavelength tunable transmitter module, e.g., a Fast Tunable Laser (FTL) 915, the second stage cross-connect module is a CAWG 92;

the at least two FTLs 915 are specifically used for converting the at least two channels of electrical signals packaged by the Signal Packaging Sub-Module 812 into at least two channels of optical burst signals whose effective areas are aligned, and sending the above-described at least two channels of optical burst signals to the at least two CAWGs 92 on corresponding wavelength based on the first information generated by the First Information Generation Sub-Module 813. In this embodiment, the one channel of optical burst signals are optical burst signals sent by one FTL 915.

In another sentence, the present embodiment achieves cross-connecting by using FTL and CAWG, the working principle of signal switching through FTL plus CAWG is shown in FIG. 3 and will not be described repeatedly here.

As shown in FIG. 9, the present embodiment will be described hereinafter by taking the data cross-connect system comprising one First Stage Cross-Connect Module 81, two CAWGs 92, one Third Stage Cross-Connect Module 83, two FTLs 915 included in the First Stage Cross-Connect Module 81 and one Receiver 833 included in the Third Stage Cross-Connect Module 83 as an example. The two CAWGs 92 are represented as CAWG 92a and CAWG 92b respectively, the two FTLs 915 are represented as FTL 915a and FTL 015b respectively.

To be specific, upon receipt of input data signals, the First Stage Cross-Connect Sub-Module 811 applies first stage cross-connecting to the input data signals based on the first information generated by the First Information Generation Sub-Module 813 so as to obtain two channels of data signals and send the above-described two channels of data signals to the Signal Packaging Sub-Module 812; the Signal Packaging Sub-Module 812 then packages the above-described two channels of data signals into two channels of electrical signals based on the synchronization information generated by the Synchronization Information Generation Sub-Module 814 and the first clock signal generated by the First Clock Generation Module 816 and sends the above-described two channels of electrical signals to the FTL 915a and the FTL 915b; then the FTL 915a converts the received electrical signals into optical burst signals whose effective areas are aligned, and sends the above-described optical burst signals on the first wavelength to the CAWG 92a based on the first information generated by the First Information Generation Sub-Module 813; similarly the FTL 915*b* also converts the received electrical signals into optical burst signals whose effective areas are aligned, and sends the above-described optical burst signals on the second wavelength to the CAWG 92*b* based on the first information generated by the First Information Generation Sub-Module 813. The first wavelength and the second wavelength may be same or different.

Upon receipt of the optical burst signals from the FTL 915*a*, the CAWG 92*a* sends the above-described optical burst signals to the Receiver 833 in the Third Stage Cross-Connect Module 83; upon receipt of the optical burst signals from the FTL 915*b*, the CAWG 92*b* sends the above-described optical burst signals to the Receiver 833 in the Third Stage Cross-Connect Module 83.

The Receiver 833 then converts the above-described optical burst signals into electrical signals and sends the above-described electrical signals to the Signal Unpackaging Sub-Module 832; the Signal Unpackaging Sub-Module 832 unpackages the electrical signals from the Receiver 833 based on the second clock signal generated by the Second Clock Generation Sub-Module 834 so as to obtain at least one channel of data signals; then the Third Stage Cross-Connect Sub-Module 835 applies the third stage cross-connecting to the at least one channel of data signals from the Signal Unpackaging Sub-Module 832 based on the third information generated by the Third Information Generation Sub-Module 831 and the second clock signal generated by the Second Clock Generation Sub-Module 834 so as to obtain output data signals.

In the present embodiment, the interval areas or ineffective areas of the optical burst signals can be used to absorb the frequency difference of different clocks, hence the first clock signals generated by different First Clock Generation Modules 816 respectively may be synchronized or not synchronized; similarly, the second clock signals generated by different Second Clock Generation Modules 834 respectively may also be synchronized or not synchronized, and there is no limitation on this in the embodiments of the present invention.

When the above-described data cross-connect system is applied to a cluster cross-connect system, the Synchronization Information Generation Sub-Module 814 is a frame header synchronization sub-module and the synchronization information generated by the Synchronization Information Generation Sub-Module 814 is a frame header synchronization signal used primarily for aligning the effective areas of the optical signals from different transmitters in the data cross-connect system so as to let different transmitters send the optical signals in the same cycle. In simple applications, the frame headers of the optical signals from different transmitters can be aligned, therefore, if the length of the optical signals is fixed and uniformed and the length of the interval or ineffective areas is also fixed and unformed, the effective areas of the optical signals from different transmitters can be aligned. It should be noted that the frame headers of the optical signals from different transmitters may also be unaligned. For example, the difference between the signals equals the length of the optical signals plus integral multiples of the interval or ineffective area. In such circumstance, if the length of the optical signals is fixed and uniformed and the length of the interval or ineffective areas is also fixed and unformed, the effective areas of the optical signals from different transmitters can also be aligned. Obviously there may be other circumstances, for example, the lengths of the optical signals are not uniformed or not fixed, and on the like, but as long as such information is configured in advance, the effective areas of the optical signals from different transmitters can still be aligned. Therefore, the primary purpose of the Synchronization Information Generation Sub-Module 814 is aligning the effective areas of the optical signals from different transmitters and many particular control signals can be used, including but not limited to the alignment approaches described above. The cross-connecting of the optical signals can be achieved and high linear rate can be supported by transmitters only when the effective areas of the optical signals from different transmitters are aligned. In this embodiment, every frame header synchronization sub-module sends frame header synchronization signals to the Signal Packaging Sub-Module 812 and the Signal Packaging Sub-Module 812 controls the alignment of the effective areas of optical signals from the transmitters connected to the Signal Packaging Sub-Module 812 based on the above-described frame header synchronization signals. Different frame header synchronization sub-modules also need to align and synchronize their respective outputted frame header synchronization signals, which is not shown in FIG. 9. To be specific, the frame header synchronization signals from different frame header synchronization sub-modules can be aligned and synchronized through tracking, e.g., using tree-like tracking manner. In simple applications, a primary module can be chosen from all frame header synchronization sub-modules and all the frame header synchronization sub-modules except the one chosen as the primary module should track and lock on the frame header synchronization signals outputted from the primary module so that synchronous alignment of the frame header synchronization signals outputted from different frame header synchronization sub-modules to the Signal Packaging Sub-Module 812 are aligned and synchronized. Obviously different frame header synchronization sub-modules may also synchronize the frame header synchronization signals without aligning such signals, and in such circumstances a scheduling algorithm is needed for adaptation according to the location difference between the frame headers of difference frame header synchronization sub-modules.

In addition, when the data cross-connect system described above is applied to a cluster cross-connect system, the Third Information Generation Sub-Module 831 is a third cross-connect configuration information generation sub-module and the third information generated by the Third Information Generation Sub-Module 831 is third cross-connect configuration information; for multi-stage cross-connecting, modification of the third cross-connect configuration information may need to be achieved through the interaction of multiple third cross-connect configuration information generation sub-modules, hence bus is needed between the multiple third cross-connect configuration information generation sub-modules for information communication, i.e., the third cross-connect configuration information generation sub-modules in different Third Stage Cross-Connect Modules 83 need to be connected to one another, and the connection is not shown in FIG. 9. In practical application, the data cross-connect system usually uses ECC for the interaction on the third cross-connect configuration information.

When the data cross-connect system described above is applied to an all-optical switching network, the Synchronization Information Generation Sub-Module 814 is a scheduling cycle synchronization sub-module and the synchronization information generated by the Synchronization Information Generation Sub-Module 814 is a scheduling cycle synchronization signal, different scheduling cycle synchronization sub-modules also need to synchronize and align the scheduling cycle synchronization signals with one another, which is not shown in FIG. 9. In addition, when the data cross-connect system described above is applied to an all-optical switching network, the Third Information Generation Sub-Module 831 is a third scheduling information generation sub-module and the third information generated by the Third Information Generation Sub-Module 831 is third scheduling information, yet no interaction is needed between different third scheduling information generation sub-modules.

In the above-described data cross-connect system, the FTL 915 can send the above-described optical burst signals to the CAWG 92 at a rate no lower than that of corresponding input data signals. Since the subracks are interconnected at a comparatively high rate, the number of interconnecting optical fibers and the connectors of such interconnecting optical fibers can be reduced, the system reliability and maintainability can be improved and the difficulty in design can be reduced; in addition, since the cross-connect subrack consists of the CAWG 92, the cross-connect subrack can apply cross-connecting directly in the optical layer, the number of cross-connect subracks can be reduced and the size and power consumption of cross-connect subracks can also be reduced.

In addition, the Second Stage Cross-Connect Module 82 in the embodiment shown in FIG. 9 may also be achieved by using the method shown in FIG. 4 or FIG. 6, which will not be described repeatedly herein.

Figure 10:
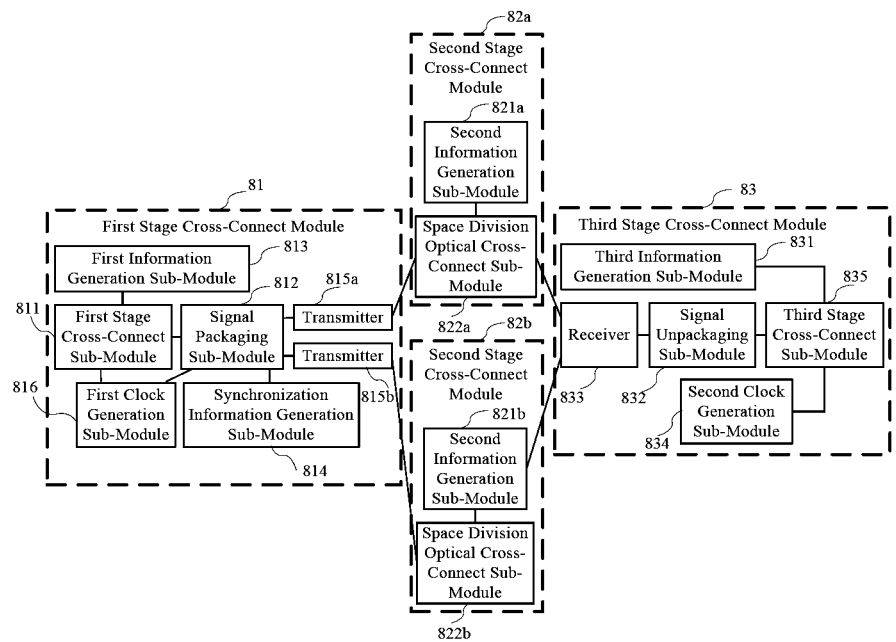
FIG. 10 is a schematic diagram illustrating the structure of yet another embodiment of a data cross-connect system in accordance with the present invention.

FIG. 10 is a schematic diagram illustrating the structure of yet another embodiment of a data cross-connect system in accordance with the present invention; the difference between the data cross-connect system shown in FIG. 10 and the data cross-connect system in the embodiment shown in FIG. 8 is that the First Stage Cross-Connect Module 81 in the present embodiment may further comprise:

a Synchronization Information Generation Sub-Module 814, used for generating synchronization information and sending the synchronization information to the Signal Packaging Sub-Module 812;

a First Clock Generation Sub-Module 816, used for generating a first clock signal and sending the first clock signal to the Signal Packaging Sub-Module 812 and/or First Stage Cross-Connect Sub-Module 811;

a Signal Packaging Sub-Module 812, specifically used for packaging at least two channels of data signals into at least two channels of electrical signals based on the synchronization information generated by the Synchronization Information Generation Sub-Module 814 and the first clock signal generated by the First Clock Generation Sub-Module 816; and a First Stage Cross-Connect Sub-Module 811, particularly used for applying a first stage cross-connecting to input data signals so as to obtain at least two channels of data signals based on the first information generated by First Information Generation Sub-Module 813 and the first clock signal generated by the First Clock Generation Sub-Module 816.

In the present embodiment, the Second Stage Cross-Connect Module 82 may comprise: a Second Information Generation Sub-Modules 821 and a Space Division Optical Cross-Connect Sub-Modules 822;

the at least two Second Information Generation Sub-Modules 821 are used for generating second information and sending the second information respectively to at least two Space Division Optical Cross-Connect Sub-Modules 822;

the at least two Space Division Optical Cross-Connect Sub-Modules 822 are used for applying, based on the second information generated by the at least two Second Information Generation Sub-Modules 821, the second stage cross-connecting to the at least two channels of continuous optical signals sent by at least two Transmitters 815 included in at least one First Stage Cross-Connect Module 81, and sending the optical burst signals obtained after the cross-connecting to at least one Third Stage Cross-Connect Module 83. In this embodiment, one channel of continuous optical signals are continuous optical signals sent by one transmitter 815.

In the present embodiment, the optical signals sent by the Transmitters 815 are continuous optical signals and, as shown in FIG. 12b, the difference between the continuous optical signal and the optical burst signal is that the burst internals between optical burst signals in the continuous optical signals are padded with ineffective information (e.g., fixed pattern or preamble, etc.) and the optical switches in the Space Division Optical Cross-Connect Sub-Module 822 need to switch in the ineffective areas so that the signals obtained by the Space Division Optical Cross-Connect Sub-Module 822 after the second stage cross-connecting are optical burst signals.

In this embodiment, the Third Stage Cross-Connect Module 83 may comprise: a Third Information Generation Sub-Module 831, a Signal Unpackaging Sub-Module 832, at least one Receiver 833 and a Third Stage Cross-Connect Sub-Module 835, the at least one Receiver 833 is used for receiving optical burst signals sent by at least one of the at least two Second Stage Cross-Connect Modules 82, converting the above-described optical burst signals into electrical signals and sending the above-described electrical signals to the Signal Unpackaging Sub-Module 832;

the Signal Unpackaging Sub-Module 832 is used for unpackaging the electrical signals sent by the at least one Receiver 833 to obtain at least one channel of data signals;

the Third Information Generation Sub-Module 831 is used for generating third information; and the Third Stage Cross-Connect Sub-Module 835 is used for applying, based on the third information generated by the Third Information Generation Sub-Module 831, the third stage cross-connecting to the at least one channel of data signals obtained by the Signal Unpackaging Sub-Module 832 so as to obtain output data signals.

Furthermore, the Third Stage Cross-Connect Module 83 may also comprise: a Second Clock Generation Sub-Module 834, used for generating a second clock signal and sending the second clock signal to the Signal Unpackaging Sub-Module 832 and/or the Third Stage Cross-Connect Sub-Module 835;

the Signal Unpackaging Sub-Module 832, particularly used for unpackaging, based on the second clock signal generated by the Second Clock Generation Sub-Module 834, the electrical signals sent by the at least one Receiver 833 to obtain at least one channel of data signals; and the Third Stage Cross-Connect Sub-Module 835, specifically used for applying, based on the third information generated by the Third Information Generation Sub-Module 831 and the second clock signal generated by the Second Clock Generation Sub-Module 834, the third stage cross-connecting to the at least one channel of data signals obtained by the Signal Unpackaging Sub-Module 832 so as to obtain output data signals.

As shown in FIG. 10, the present embodiment will be described hereinafter by taking the above-described data cross-connect system comprising one First Stage Cross-Connect Module 81, two Second Stage Cross-Connect Modules 82, one Third Stage Cross-Connect Module 83, two Transmitters 815 included in the First Stage Cross-Connect Module 81, and one Receive 833 included in the Third Stage Cross-Connect Module 83 as an example. Wherein the above-described two Second Stage Cross-Connect Modules 82 are denoted as Second Stage Cross-Connect Module 82a and Second Stage Cross-Connect Module 82b; wherein the Second Stage Cross-Connect Module 82a further comprises a Second Information Generation Sub-Module 821a and a Space Division Optical Cross-Connect Sub-Module 822a, and the Second Stage Cross-Connect Module 82b further comprises a Second Information Generation Sub-Module 821b and a Space Division Optical Cross-Connect Sub-Module 822b. The two Transmitters 815 are denoted as Transmitter 815a and Transmitter 815b.

To be specific, upon receipt of input data signals, the First Stage Cross-Connect Sub-Module 811 applies the first stage cross-connecting to the input data signals based on the first information generated by the First Information Generation Sub-Module 813 to obtain two channels of data signals and sends the above-described two channels of data signals to the Signal Packaging Sub-Module 812; the Signal Packaging Sub-Module 812 then packages the above-described two channels of data signals into two channels of electrical signals based on synchronization information generated by the Synchronization Information Generation Sub-Module 814 and the first clock signal generated by First Clock Generation Sub-Module 816, and sends the above-described two channels of electrical signals to Transmitter 815a and Transmitter 815b respectively; then the Transmitter 815a converts the received electrical signals into continuous optical signals whose effective areas are aligned, and sends the above-described continuous optical signals to the Space Division Optical Cross-Connect Module 822a, similarly, the Transmitter 815b also converts the received electrical signals into continuous optical signals whose effective areas are aligned, and sends the above-described continuous optical signals to the Space Division Optical Cross-Connect Module 822b.

Upon receipt of the continuous optical signals from the Transmitter 815a and the Transmitter 815b, the Second Stage Cross-Connect Sub-Module 822a and the Second Stage Cross-Connect Sub-Module 822b apply the second stage cross-connecting to the continuous optical signals from the Transmitter 815a and the Transmitter 815b respectively based on the second information generated respectively by the Second Information Generation Sub-Module 821a and the Second Information Generation Sub-Module 821b, and then send the two channels of optical burst signals obtained after the cross-connecting to the Receiver 833 in the Third Stage Cross-Connect Module 83.

The Receiver 833 then converts the optical burst signals into electrical signals and sends the above-described electrical signals to the Signal Unpackaging Sub-Module 832; the Signal Unpackaging Sub-Module 832 unpackages the electrical signals from the Receiver 833 based on the second clock signal generated by the Second Clock Generation Sub-Module 834 so as to obtain at least one channel of data signals; then the Third Stage Cross-Connect Sub-Module 835 applies the third stage cross-connecting to the at least one channel of data signals from the Signal Unpackaging Sub-Module 832 based on the third information generated by the Third Information Generation Sub-Module 831 and the second clock signal generated by the Second Clock Generation Sub-Module 834 so as to obtain output data signals.

In the present embodiment, the ineffective areas of the optical signals can be used to absorb the frequency difference of different clocks, hence the first clock signals generated by different First Clock Generation Modules 816 may be synchronized or not synchronized; similarly, the second clock signals generated by different Second Clock Generation Modules 834 respectively may also be synchronized or not synchronized, and there is no limitation on this in the embodiments of the present invention.

In this embodiment, the Transmitter 815 can be a colored optical interface, e.g., an optical interface in accordance with the wavelength standards of multi-channel optical systems such as a Wavelength Division Multiplexing (WDM) standards and the like; the Transmitter 815 can also be a grey optical interface (i.e., white optical interface), e.g., an optical interface in accordance with the standards of intra-office systems such as the ITU-T G.693 Standard and the like. If the Transmitter 815 is a grey optical interface, the Space Division Optical Cross-Connect Sub-Module 822 can be achieved through the approach provided in FIG. 5; and if the Transmitter 815 is a colored optical interface, the Space Division Optical Cross-Connect Sub-Module 822 can be achieved by using micro-ring based fast optical filter array.

When the above-described data cross-connect system is applied to a cluster cross-connect system, the Synchronization Information Generation Sub-Module 814 is a frame header synchronization sub-module and the synchronization information generated by the Synchronization Information Generation Sub-Module 814 is a frame header synchronization signal used primarily for aligning the effective areas of the optical signals from different transmitters in the data cross-connect system so as to let different transmitters send the optical signals in the same cycle. In simple applications, the frame headers of the optical signals from different transmitters can be aligned, therefore, if the length of the optical signals is fixed and uniformed and the length of the interval or ineffective areas is also fixed and unformed, the effective areas of the optical signals from different transmitters can be aligned. It should be noted that the frame headers of the optical signals from different transmitters may also be unaligned, for example, the difference equals the length of the optical signals plus integral multiples of the interval or ineffective area, in such circumstance, if the length of the optical signals is fixed and uniformed and the length of the interval or ineffective areas is also fixed and unformed, the effective areas of the optical signals from different transmitters can also be aligned. Obviously there may be other circumstances, for example, the lengths of the optical signals are not uniformed or not fixed, or the like, but as long as such information is configured in advance, the effective areas of the optical signals from different transmitters can also be aligned. Therefore, the primary purpose of the Synchronization Information Generation Sub-Module 814 is aligning the effective areas of the optical signals from different transmitters and many particular control signals can be used, including but not limited to the alignment approaches described above. The cross-connecting of the optical signals can be achieved and high linear rate can be supported by transmitters only when the effective areas of the optical signals from different transmitters are aligned. In the present embodiment, every frame header synchronization sub-module sends frame header synchronization signals to the Signal Packaging Sub-Module 812 and the Signal Packaging Sub-Module 812 then controls the alignment of the effective areas of optical signals from the transmitters connected to the Signal Packaging Sub-Module 812 based on the above-described frame header synchronization signals. Different frame header synchronization sub-modules also need to align and synchronize their respective outputted frame header synchronization signals, which is not shown in FIG. 10. To be specific, the frame header synchronization signals outputted from different frame header synchronization sub-modules can be aligned and synchronized through tracking, e.g., using tree-like tracking manner. In simple circumstances, a primary module can be chosen from all frame header synchronization sub-modules and all the frame header synchronization sub-modules except the one chosen as the primary module track and lock on the frame header synchronization signals outputted from the primary module so that the frame header synchronization signals outputted from different frame header synchronization sub-modules to the Signal Packaging Sub-Module 812 are aligned and synchronized. Obviously different frame header synchronization sub-modules may also just synchronize the frame header synchronization signals without aligning such signals, and in such circumstances a scheduling algorithm is needed for adaptation based on the location difference between the frame headers of difference frame header synchronization sub-modules.

In addition, when the data cross-connect system described above is applied to a cluster cross-connect system, the Second Information Generation Sub-Module 821 is a second cross-connect configuration information generation sub-module and the second information generated by the Second Information Generation Sub-Module 821 is second cross-connect configuration information; for multi-stage cross-connecting, modification of the second cross-connect configuration information may need to be achieved through the interaction of multiple second cross-connect configuration information generation sub-modules, hence bus is needed between the multiple second cross-connect configuration information generation sub-modules for information communication, i.e., the second cross-connect configuration information generation sub-modules in different Second Stage Cross-Connect Modules 82 need to be connected to one another, and the connection is not shown in FIG. 10. In practical application, the data cross-connect system usually uses ECC for the interaction on the second cross-connect configuration information.

In addition, when the data cross-connect system described above is applied to a cluster cross-connect system, the Third Information Generation Sub-Module 831 is a third cross-connect configuration information generation sub-module and the third information generated by the Third Information Generation Sub-Module 831 is the third cross-connect configuration information; for multi-stage cross-connecting, modification of the third cross-connect configuration information may need to be achieved through the interaction of multiple third cross-connect configuration information generation sub-modules, hence bus is needed between the multiple third cross-connect configuration information generation sub-modules for information communication, i.e., the third cross-connect configuration information generation sub-modules in different Third Stage Cross-Connect Modules 83 respectively need to be connected to one another, and the connection is not shown in FIG. 10. In practical application, the data cross-connect system usually uses ECC for the interaction on the third cross-connect configuration information.

In addition, when the data cross-connect system described above is applied to an all-optical switching network, the Synchronization Information Generation Sub-Module 814 is a scheduling cycle synchronization sub-module and the synchronization information generated by the Synchronization Information Generation Sub-Module 814 is a scheduling cycle synchronization signal, different scheduling cycle synchronization sub-modules also need to synchronize and align the scheduling cycle synchronization signals with one another, which is not shown in FIG. 10. In addition, when the data cross-connect system described above is applied to an all-optical switching network, the Second Information Generation Sub-Module 821 is a second scheduling information generation sub-module and the second information generated by the Second Information Generation Sub-Module 821 is second scheduling information, yet no interaction is needed between different second scheduling information generation sub-modules. In addition, when the data cross-connect system described above is applied to an all-optical switching network, the Third Information Generation Sub-Module 831 is a third scheduling information generation sub-module and the third information generated by the Third Information Generation Sub-Module 831 is the third scheduling information, yet no interaction is needed between different third scheduling information generation sub-modules.

In the above-described data cross-connect system, the Transmitter 815 can send the continuous optical signals to the Space Division Optical Cross-Connect Sub-Module 822 at a rate no lower than that of corresponding input data signals. Since the subracks are interconnected at a comparatively high rate, the number of interconnecting optical fibers and the connectors of such interconnecting optical fibers can be reduced, the system reliability and maintainability can be improved and the difficulty in design can be reduced; in addition, since the cross-connect subrack consists of the Space Division Optical Cross-Connect Sub-Modules 822, the cross-connect subrack can apply cross-connecting directly in the optical layer, the number of cross-connect subracks can be reduced and the size and power consumption of cross-connect subracks can also be reduced.

Figure 11:
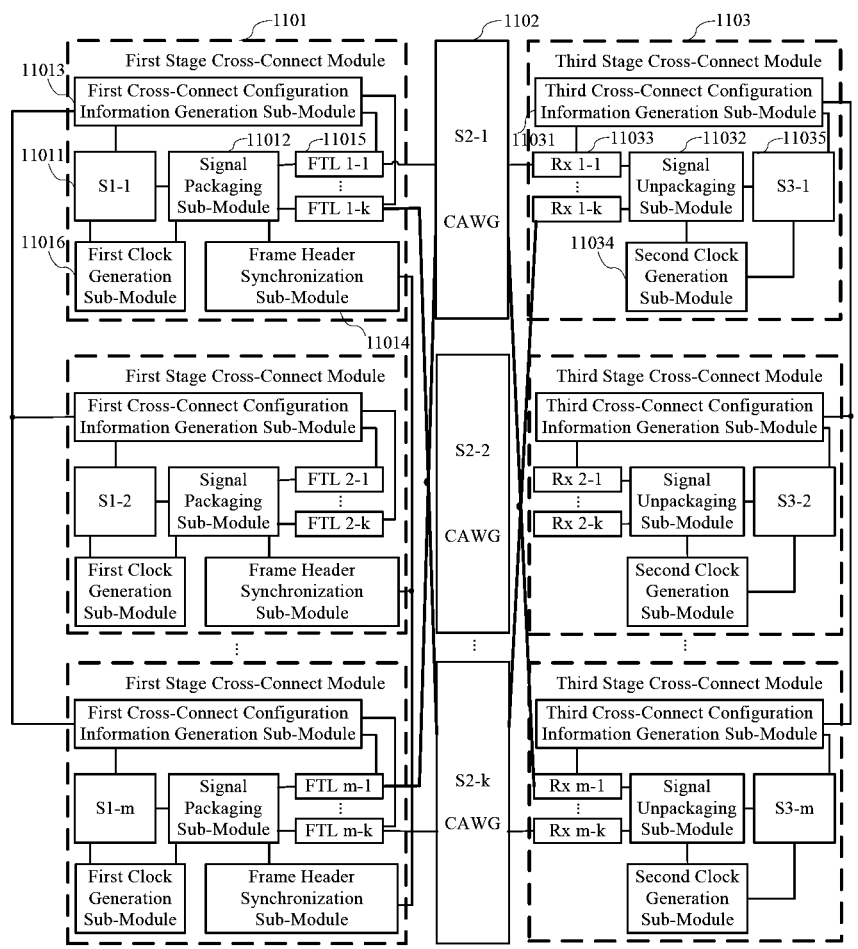
FIG. 11 is a schematic diagram illustrating the structure of yet another embodiment of a data cross-connect system in accordance with the present invention.

FIG. 11 is a schematic diagram illustrating the structure of yet another embodiment of a data cross-connect system in accordance with the present invention. The embodiment will be described herein based on the transmitter being an FTL and the second stage cross-connect module being a CAWG as an example, and the data cross-connect system provided in the present embodiment is used in cluster cross-connect systems.

As shown in FIG. 11, the data cross-connect system may comprise m First Stage Cross-Connect Modules 1101, k CAWGs 1102 at the size of m×m and m Third Stage Cross-Connect Modules 1103; where m and k are positive integers, m≥1, k≥1.

Each of the First Stage Cross-Connect Modules 1101 comprises a First Stage Cross-Connect Sub-Module 11011 at the size of n×k, a Signal Packaging Sub-Module 11012, a First Cross-Connect Configuration Information Generation Sub-Module 11013, a Frame Header Synchronization Sub-Module 11014, k FTLs 11015 and a First Clock Generation Sub-Module 11016.

Each of the Third Stage Cross-Connect Sub-Modules 1103 comprises a Third Stage Cross-Connect Configuration Information Generation Sub-Module 11031, a Signal Unpackaging Sub-Module 11032, k Receivers 11033, a Second Clock Generation Sub-Module 11034 and a Third Stage Cross-Connect Sub-Module 11035 at the size of n×k.

In FIG. 11, the n×k sized First Stage Cross-Connect Sub-Module 11011 included in each of the m First Stage Cross-Connect Modules 1101 is denoted as S1-1, S1-2, . . . , S1-m; the k FTLs 11015 included in each of the m First Stage Cross-Connect Modules 1101 are denoted as FTL 1-1, . . . , FTL 1-k, FTL 2-1, . . . , FTL 2-k, . . . , FTL m-1, . . . , FTL m-k.

In FIG. 11, the k CAWGs 1102 at the size of m×m are indicated as S2-1, S2-2, . . . , S2-k.

In FIG. 11, the n×k sized Third Stage Cross-Connect Sub-Module 11035 included in each of the m Third Stage Cross-Connect Modules 1103 is represented as S3-1, S3-2, . . . , S3-m; the k Receivers 11033 included in each of the m Third Stage Cross-Connect Modules 1103 are represented as Rx 1-1, . . . , Rx 1-k, Rx 2-1, . . . , Rx 2-k, . . . , Rx m-1, Rx m-k.

In the present embodiment, n is a positive integer and n≥1.

To be specific, upon receipt of n channels of data signals, the First Stage Cross-Connect Sub-Modules 11011 included in each of the First Stage Cross-Connect Modules 1101 apply first stage cross-connecting to the n channels of data signals based on the first cross-connect configuration information generated by the First Cross-Connect Configuration Information Generation Sub-Module 11013, obtain k channels of data signals, and send the above-described k channels of data signals to the Signal Packaging Sub-Module 11012; the Signal Packaging Sub-Module 11012 packages the above-described k channels of data signals into k channels of electrical signals based on the frame header synchronization information generated by the Frame Header Synchronization Sub-Module 11014 and the first clock signal generated by the First Clock Generation Sub-Module 11016, and sends the above-described k channels of electrical signals to k FTLs 11015 respectively, i.e., every FTL 11015 receives one channel of electrical signals; then each of the k FTLs 11015 converts the above-described one channel of electrical signals into one channel of optical burst signals whose effective areas are aligned, and sends the one channel of optical burst signals to k CAWGs 1102 respectively on corresponding wavelength based on the first cross-connect configuration information generated by the First Cross-Connect Configuration Information Generation Sub-Module 11013.

Upon receipt of the optical burst signals sent by k FTLs 11015 in the m First Cross-Connect Modules 1101 respectively, every CAWG 1102 receives m channels of optical burst signals; then each of the k CAWGs 1102 sends the received m channels of optical burst signals respectively to the k Receivers 11033 in the m Third Stage Cross-Connect Modules 11033.

Then the k Receivers 11033 convert the received optical burst signals into electrical signals and send the above-described electrical signals to the Signal Unpackaging Sub-Module 11032; the Signal Unpackaging Sub-Module 11032 unpackages the electrical signals from the Receivers 11033 based on the second clock signal generated by the Second Clock Generation Sub-Module 11034 so as to obtain k channels of data signals; then the Third Stage Cross-Connect Sub-Module 11035 applies the third stage cross-connecting to the k channels of data signals from the Signal Unpackaging Sub-Module 11032 based on the third cross-connect configuration information generated by the Third Cross-Connect Configuration Information Generation Sub-Module 11031 and the second clock signal generated by the Second Clock Generation Sub-Module 11034 so as to obtain n channels of data signals.

In the present embodiment, the length of the optical burst ("OB" hereinafter) signals is relatively fixed. The relatively fixed length is defined as a length of the OB signals that requires the interaction and agreement of other supporting modules in the data cross-connect system to change. Usually in practical applications, the length of the OB signals is fixed and uniform in order to simplify the system design.

The Signal Packaging Sub-Module 11012 packages the cross-connect granules of the k channels of electrical signals to be cross-connected into the payload areas of the OB signals. Since the OB signals need to support burst-mode receiving, the signals usually have preamble, delimiter and other overhead. In order to support switching the above-described cross-connect granules directly in the optical layer, the Signal Packaging Sub-Module 11012 needs to package one cross-connect granule into one OB signal. FIG. 12a shows an example of packaging an optical data unit 0 (ODU0 hereinafter) into the payload area of an OB signal, wherein the ODU0 is a cross-connect granule and FIG. 12a is a schematic diagram illustrating an embodiment of the OB signal of the present invention. It should be noted that the format of the electrical signals packaged by the Signal Packaging Sub-Module 11012 is determined primarily by the FTL 11015 so that the format of the OB signals outputted by the FTL 11015 is similar to the signal format shown in FIG. 12a, i.e., in this embodiment, the format of the electrical signals packaged by the Signal Packaging Sub-Module 11012 may be different from the signal format shown in FIG. 12a.

As shown in FIG. 12a, there are burst intervals between OB signals and the burst intervals are ineffective areas. Theoretically, there should be little or no optical power during the burst intervals, however, in practical applications, since the FTL 11015 needs some time for wavelength tuning, there may be some residual optical power in the burst intervals, and in particular cases, there may be much residual optical power in the burst intervals, but the receiving end dumps all the signals in the burst intervals, hence the residual optical power in the burst intervals does not impact the implementation of the embodiments of the present invention.

The signals in FIG. 12a are organized into frames for the cross-connecting.

For example, if the first cross-connect configuration information does not change, the OB signals from a same transmitter (FTL) to a same receiver (Rx) are always sent in a regular cycle. As shown in FIG. 12a, suppose the cycle equals the OB frame length, the OB signals from a same FTL to a same Rx will always appear at a fixed position in OB frames. The OB signals at the fixed position in different OB frames constitute an OB channel, i.e., a channel of OB signals, in other words, in this embodiment, the OB signals sent by one FTL are a channel of OB signals. The data cross-connect system provided in the present embodiment achieves the cross-connecting of OB signals.

Since one OB frame may include multiple OB signals and every OB signal may include one cross-connect granule, the rate of the channel of OB signals sent by the FTL 11015 is not lower than the corresponding rate of the cross-connect granules. In FIG. 12a, for example, the OB frame can be 125 s, the sending rate of FTL 11015 is 12.5 Gbit/s, a burst interval is 1 s, the length of an OB signal is 14.625 s, and hence 8 ODU0 can be packaged into every OB frame.

It is shown in FIG. 12a that the wavelength of the OB signals at a same position in two different OB frames may be different. In the present embodiment, the FTL 11015 sends OB signals to the CAWG 1102 on corresponding wavelength based on the first cross-connect configuration information and the features of the CAWG 1102 so that the OB signals may reach different Receivers 11033 after passing through the CAWG 1102. In this way, the FTL 11015 cooperates with the CAWG 1102 to achieve the second stage cross-connecting and the cross-connect granules are OB signals (actually indicating the cross-connect granules packaged in the OB signals, such as the ODU0 in FIG. 12a). Another function of the FTL 11015 is interconnection of optical burst signals between subracks (primarily indicating between cable subrack and cross-connect subrack), and it can be seen from the above example that the transmission rate of the FTL 11015 is 12.5 Gbit/s when the cross-connect granules are ODU0, therefore the number of interconnecting optical fibers can be greatly reduced. Take 8 ODU0s packages into every OB frame as an example, compared to a technical scheme in the prior art which uses MEMS to switch cross-connect granules, the number of the interconnecting optical fibers in the present embodiment can be reduced to around ⅛ of that which are needed in the existing technical solution using MEMS for switching cross-connect granules.

In all-optical switching network applications, the optical signal length plus interval (or ineffective area) in FIG. 12a or 12b may be used directly as a scheduling cycle, or the total length of several optical signals plus intervals (or ineffective areas), e.g., the frame cycle in FIG. 12a, may be used as a scheduling cycle.

In the present embodiment, the primary function of the First Cross-Connect Configuration Information Generation Sub-Module 11013 is generating first cross-connect configuration information and sending the first cross-connect configuration information to k FTLs 11015 to control the FTLs in a way that the k FTLs 11015 configure the cross-connection in accordance with the first cross-connect configuration information. To be specific, an FTL 11015 needs to be controlled to modulate a channel of OB signals to a specific wavelength to achieve the second stage cross-connecting. In addition, the First Cross-Connect Configuration Information Generation Sub-Module 11013 also needs to send the first cross-connect configuration information generated to the First Cross-Connect Sub-Module 11011 to control the First Cross-Connect Sub-Module 11011 in a way that the First Cross-Connect Sub-Module 11011 configures the cross-connection in accordance with the first cross-connect configuration information to achieve the first stage cross-connecting.

In addition, the primary function of the Third Cross-Connect Configuration Information Generation Sub-Module 11031 is generating third cross-connect configuration information and sending the third cross-connect configuration information to the Third Stage Cross-Connect Sub-Module 11035 to control the Third Stage Cross-Connect Sub-Module 11035 in a way that the Third Stage Cross-Connect Sub-Module 11035 configures the cross-connection in accordance with the third cross-connect configuration information to achieve the third stage cross-connect.

For multi-stage cross-connecting, multiple First Cross-Connect Configuration Information Generation Sub-Modules 11013 need to interact with each other to modify first cross-connect configuration information, hence bus is needed between the First Cross-Connect Configuration Information Generation Sub-Modules 11013 for information interaction. In practical application, a data cross-connect system usually uses ECC channels for the interaction on first cross-connect configuration information. Similarly, multiple Third Cross-Connect Configuration Information Generation Sub-Modules 11031 need to interact with each other to modify third cross-connect configuration information, hence bus is also needed between the Third Cross-Connect Configuration Information Generation Sub-Modules 11031 for information interaction. In practical application, a data cross-connect system usually uses ECC channels for the interaction on third cross-connect configuration information.

The primary function of the Frame Header Synchronization Sub-Module 11014 is synchronizing and aligning the frame headers of the OB frames from different FTLs 11015 in the data cross-connect system, i.e., aligning the effective areas of the OB frames so as to control the k FTLs 11015 in a way that different FTLs 11015 send corresponding OB signals respectively in the same cycle. The OB channel cross-connecting can be achieved and the high linear rate of FTLs 11015 can be supported only when the frame headers of the OB frames from different FTLs 11015 are synchronized and aligned. In FIG. 11, the Frame Header Synchronization Sub-Module 11014 in every First Stage Cross-Connect Module 1101 sends a frame header synchronization signal to the Signal Packaging Sub-Module 11012, the Signal Packaging Sub-Module 11012 then controls the FTL 11015 connected to the Signal Packaging Sub-Module 11012 in a way that the headers of the OB frames outputted by the FTL 11015 are synchronized and aligned based on the frame header synchronization signal, and specifically, the signal packaging sub-module 11012 may control the FTL 11015 connected to the signal packaging sub-module 11012 in a way that the delimiter fields in the headers of the OB frames outputted by the FTL 11015 are synchronized and aligned based on the above-described frame header synchronization signal. Different frame header synchronization sub-modules 11014 also need to synchronize and align their respective outputted frame header synchronization signals. To be specific, the frame header synchronization signals from different frame header synchronization sub-modules can be aligned and synchronized through tracking: a primary module can be chosen from all frame header synchronization sub-modules 11014 and all the frame header synchronization sub-modules 11014 except the one chosen as the primary module track and lock on a frame header synchronization signal outputted from the primary module so that the frame header synchronization signals from different Frame Header Synchronization Sub-Modules 11014 to the Signal Packaging Sub-Module 11012 are aligned and synchronized. Obviously different frame header synchronization sub-modules 11014 may also just synchronize the frame header synchronization signals without aligning such signals, and in such circumstances a scheduling algorithm is needed for adaptation based on the location difference between the frame headers of difference frame header synchronization sub-modules 11014.

In the data cross-connect system provided in this embodiment, properly designed burst intervals can be used to absorb the header synchronization error so that the requirement on the frame header synchronization may not be very strict, therefore the whole data cross-connect system can support reconfigurable non-blocking cross-connect matrix, i.e., can support adding new cross-connection without interrupting or disturbing existing cross-connection. For example, when the burst interval is 1 s as described above, while in practical applications, the time needed for the wavelength switching of the FTL 11015 can be controlled to be less than 300 ns, therefore the maximum error allowed with the frame header synchronization is 700 ns, which is equivalent to a length different of around 140 m between the interconnecting optical fibers of different subracks. In addition, in this embodiment, since the switching rate of a FTL 11015 is relatively high, e.g., around 300 ns, that is, the time needed for second stage switching is absorbed by ineffective burst intervals and does not influence the scheduling of cross-connect granules, hence the data cross-connect system provided in this embodiment may use reconfigurable non-blocking cross-connect matrix. In FIG. 11, k equals n in a practical design of the cross-connect matrix so that the number of interconnecting optical fibers and the number of CAWGs can further be reduced by half.

The first clock generation sub-module 11016 is primarily used for providing a reference clock for the First Cross-Connect Sub-Module 11011 and the Signal Packaging Sub-Module 11012 and the Second Clock Generation Sub-Module 11034 is primarily used for providing a reference clock for the Signal Unpackaging Sub-Module 11032 so that these modules can lock on the reference clock and package and demodulate the data to be transmitted. As there are burst intervals, the respective First Clock Generation Sub-Modules 11016 in the above-described data cross-connect system do not need to be synchronized, and similarly, the respective Second Clock Generation Sub-Modules 11034 also do not need to be synchronized, the burst intervals absorb the frequency difference between different clocks; obviously the embodiments of the present invention is not limited to such practice, the First Clock Generation Sub-Modules 11016 can be synchronized and the Second Clock Generation Sub-Modules 11034 can be synchronized in a way similar to the synchronization of the Frame Header Synchronization Sub-Modules 11014 so that the length of the burst intervals can be reduced and the bandwidth utility rate can be increased, yet the system using such approach may be harder to design.

The cross-connect subracks in the data cross-connect system provided in this embodiment comprise primarily CAWGs 1102 and CAWGs 1102 basically does not need to be controlled (in practical applications, CAWGs need to work at a stable temperature, so temperature control is needed), therefore the power consumption as well as the size of the cross-connect subracks can be reduced.

Figure 13:
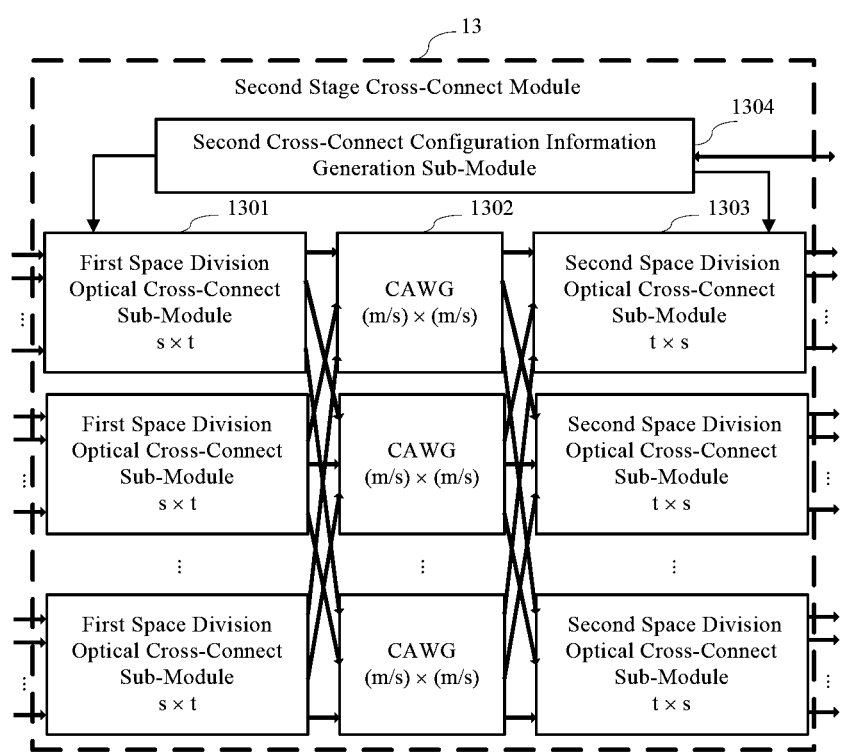
FIG. 13 is a schematic diagram illustrating the structure of yet another embodiment of a second stage cross-connect module in accordance with the present invention.

In the embodiment shown in FIG. 11, the FTL and CAWG work together to achieve the second stage cross-connect, hence the FTL needs to have comparatively large wavelength tuning range and the CAWG needs to support a comparatively large number of ports. Suppose in the data cross-connect system shown in FIG. 11 of the present invention, the FTL needs to support fast tuning in a wavelength range of m and the CAWG needs to support m×m ports. In the embodiment shown in FIG. 13 of the present invention, FTL, space division optical cross-connect sub-module and CAWG may be used together to achieve a second stage cross-connect module; to be specific, the module shown in FIG. 13 can be used to replace the second stage cross-connect module in FIG. 11. FIG. 13 is a schematic diagram illustrating the structure of yet another embodiment of a second stage cross-connect module in accordance with the present invention and FIG. 13 shows the structure of a second stage cross-connect module, which is similar to the structure of other second stage cross-connect modules.

As shown in FIG. 13, the Second Stage Cross-Connect Module 13 in this embodiment also consists of three stages, the first stage is First Space Division Optical Cross-Connect Sub-Modules 1301 at the size of s×t and at the quantity of m/s; the second stage is (m/s)×(m/s) CAWGs 1302 at the quantity of t; the third stage is t×s Second Space Division Optical Cross-Connect Sub-Modules 1303 at the quantity of m/s; where m/s and t are positive integers, m/s≥1, t≥1.

It can be seen in FIG. 13 that the second stage cross-connect module also comprises internally a 3-stage CLOS matrix, so t needs to be equal or greater than 2 s−1 to achieve strict sense non-blocking and t needs to equal s as the minimum requirement to achieve non-blocking reconfiguration.

The switching speed of the above-described First Space Division Optical Cross-Connect Sub-Modules 1301 and the Second Space Division Optical Cross-Connect Sub-Modules 1303 has to be compatible with the burst intervals, i.e., has to be around several hundred nanoseconds. In practical applications, fast optical switch array may be used, e.g., the approach shown in FIG. 5.

As shown in FIG. 5, a 10×10 space division optical cross-connect sub-module may consist of a hundred 1:1 fast optical switches, ten 1:10 dividers and ten 10:1 combiners. Obviously the present invention is not limited to such practice, the space division optical cross-connect sub-module may also consist of multi-level cascade of 1:2 optical switches and the present invention does not limit the approach for achieving the space division optical cross-connect sub-module. However, a space division optical cross-connect sub-module consisting of optical switch array can simplify the process of the second stage cross-connecting.

Similar to the embodiment shown in FIG. 11, if the switching speed of the First Space Division Optical Cross-Connect Sub-Modules 1301 and the Second Space Division Optical Cross-Connect Sub-Modules 1303 is high enough, the second stage cross-connect module shown in FIG. 13 also supports reconfigurable non-blocking cross-connect matrix, i.e., t=s.

It can be seen in FIG. 13 that the size of CAWG is reduced from m×m in FIG. 11 to (m/s)×(m/s) in FIG. 13 and, specifically, the wavelength tuning range of the FTL is reduced from m in FIG. 11 to m/s in FIG. 13.

Since the First Space Division Optical Cross-Connect Sub-Modules 1301 and the Second Space Division Optical Cross-Connect Sub-Modules 1303 are added, a Second Cross-Connect Configuration Information Generation Sub-Module 1304 needs to be introduced as shown in FIG. 13 to generate second cross-connect configuration information and send the second cross-connect configuration information to the First Space Division Optical Cross-Connect Sub-Modules 1301 and the Second Space Division Optical Cross-Connect Sub-Modules 1303 to control the First Space Division Optical Cross-Connect Sub-Modules 1301 and the Second Space Division Optical Cross-Connect Sub-Modules 1303 to achieve cross-connecting.

In addition, different Second Cross-Connect Configuration Information Generation Sub-Modules 1304 need to interact with each other and, specifically, since the second stage cross-connect module is usually located in a cross-connect subrack and the first stage cross-connect module and the third stage cross-connect module are usually located in a cable subrack, hence in this embodiment the Second Cross-Connect Configuration Information Generation Sub-Modules 1304 are different from the First Cross-Connect Configuration Information Generation Sub-Module 11013 and the Third Cross-Connect Configuration Information Generation Sub-Module 11031, the Second Cross-Connect Configuration Information Generation Sub-Modules 1304, the First Cross-Connect Configuration Information Generation Sub-Module 11013 and the Third Cross-Connect Configuration Information Generation Sub-Module 11031 also need to interact with each other; to be specific, ECC can be used for the interaction between the Second Cross-Connect Configuration Information Generation Sub-Modules 1304, the First Cross-Connect Configuration Information Generation Sub-Module 11013 and the Third Cross-Connect Configuration Information Generation Sub-Module 11031.

As described above, this embodiment makes the FTLs and the CAWGs easier to achieve, but also adds the First Space Division Optical Cross-Connect Sub-Modules 1301 and the Second Space Division Optical Cross-Connect Sub-Modules 1303 into the system and increases the quantity of the CAWGs 1302, hence in this embodiment, the number and power consumption of subracks will be relatively greater than the number and power consumption of subracks in the data cross-connect system provided by the embodiment shown in FIG. 11 of the present invention, yet the data cross-connect system provided in this embodiment still has advantages over that in the prior art concerning the power consumption and size when the value of s is chosen properly. Furthermore, along with the increase of the integration level with optical components such as the space division optical cross-connect modules and the CAWGs, the power consumption and size advantage of this embodiment will become even greater.

The embodiments of the present invention can largely reduce the size and power consumption of a data cross-connect system with multiple cascade subracks, or, given a same size and power consumption, the embodiments of the present invention can largely increase the cross-connect capacity supported by the whole data cross-connect system. The details are given as follows:

1. Optical burst signals are used in the interconnection between cross-connect subracks and cross-connect granules are packaged in the optical burst signals for high linear rate interconnection, hence smaller cross-connect granules are supported while high rate interconnection between cross-connect subracks is also supported, therefore the number of interconnecting optical fibers and connectors can be reduced, reliability and maintainability can be improved and the difficulty in design can be reduced.

2. Since the cross-connect subracks consist primarily of optical modules such as CAWGs and the like, the cross-connect subrack can achieve cross-connecting directly in the optical layer and the size and power consumption of the cross-connect frame can be reduced.

3. As the cross-connection is achieved through optical channels, the burst intervals between optical burst signals absorb the frame synchronization errors caused by the interconnection of the cross-connect subracks as well as the frequency difference between the clocks used by each of the cross-connect subracks, therefore the reconfigurable cross-connect matrix can be used to support the cross-connect configuration requirements of the cross-connect system and the number of interconnecting optical fibers and connectors as well as the size and the power consumption of the cross-connect subracks can be further reduced.

Figure 14:
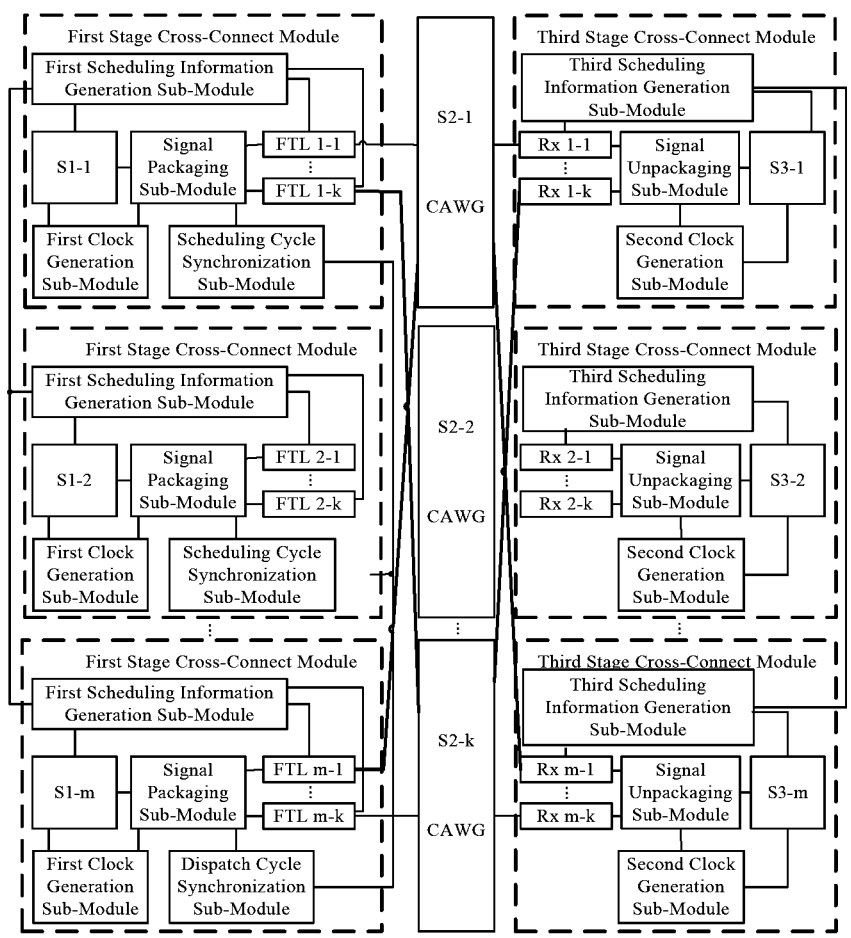
FIG. 14 is a schematic diagram illustrating the structure of an embodiment of an all-optical switching network in accordance with the present invention.

The data cross-connect system provided by the present invention can be used not only in the cross-connect devices of optical transmission networks, but also in the switching networks in cluster routers, as shown in FIG. 14. FIG. 14 is a schematic diagram illustrating the structure of an embodiment of an all-optical switching network in accordance with the present invention, and by comparing with the data cross-connect system shown in FIG. 11, it can be learnt that when the present invention is applied in an all-optical switching network, the cross-connect configuration information generation sub-modules need to be changed into a scheduling information generation sub-modules and different scheduling information generation sub-modules do not need to interact with each other. Meanwhile, the frame header synchronization sub-modules also need to be changed into scheduling cycle synchronization sub-modules.

Figure 15:
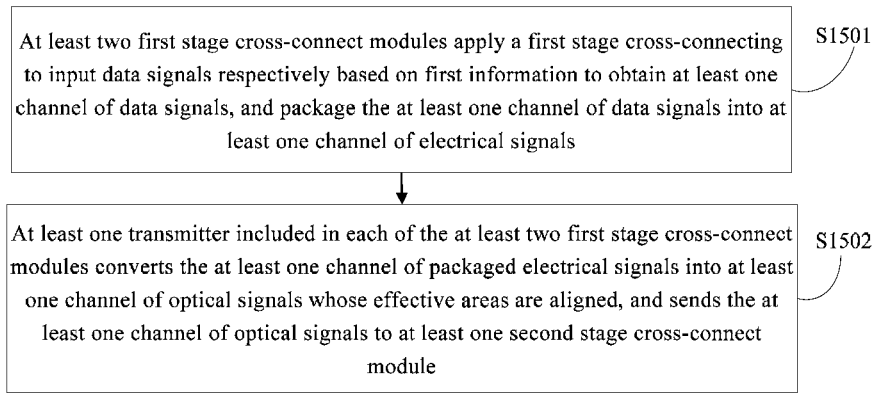
FIG. 15 is a flow diagram illustrating an embodiment of a data cross-connect method in accordance with the present invention.

FIG. 15 is a flow diagram illustrating an embodiment of a data cross-connect method in accordance with the present invention and the data cross-connect method can be suited in a data cross-connect system provided in any of the embodiments shown in FIGS. 1-7. As shown in FIG. 15, the data cross-connect method may comprise:

Step 1501: applying a first stage cross-connecting to input data signals by at least two first stage cross-connect modules respectively based on first information to obtain at least one channel of data signals respectively, and packaging respectively the above-described at least one channel of data signals into at least one channel of electrical signals; and Step 1502: converting the at least one channel of packaged electrical signals into at least one channel of optical signals whose effective areas are aligned by at least one transmitter included in each of the at least two first stage cross-connect modules, sending the above-described at least one channel of optical signals to at least one second stage cross-connect module so that the at least one second stage cross-connect module can apply a second stage cross-connecting to the at least one channel of optical signals sent by the at least one transmitter included in each of the at least two first stage cross-connect modules and send the optical burst signals obtained after the cross-connecting to at least one third stage cross-connect module.

In this embodiment, after the Step 1502, the at least one third stage cross-connect module converts the optical burst signals from the at least one second stage cross-connect module into electrical signals, unpackages the above-described electrical signals to obtain at least one channel of data signals and applies a third stage cross-connecting to the at least one channel of data signals to obtain output data signals.

In an application of this embodiment, the transmitter may be a fast wavelength tunable transmitter module, e.g., an FTL, the second stage cross-connect module may be a CAWG and the above-described optical signals may be optical burst signals; furthermore, converting the at least one channel of packaged electrical signals into at least one channel of optical signals whose effective areas are aligned by at least one transmitter included in each of the at least two first stage cross-connect modules may comprise: converting the at least one channel of packaged electrical signals into at least one channel of optical signals whose effective areas are aligned by at least one fast wavelength tunable transmitter module included in each of the at least two first stage cross-connect modules; and sending the above-described at least one channel of optical signals to at least one second stage cross-connect module may comprise: sending at least one channel of optical burst signals to at least one CAWG at corresponding wavelength based on the first information by at least one fast wavelength tunable transmitter module included in each of the at least two first stage cross-connect modules.

Figure 16:
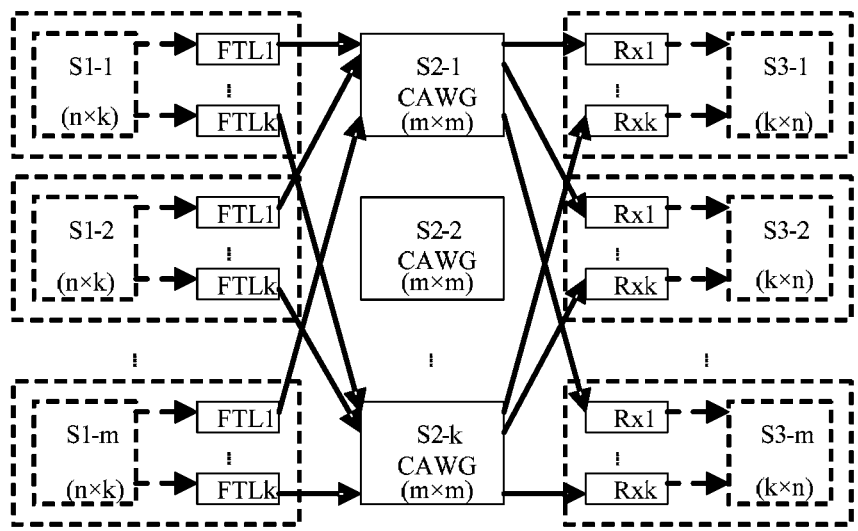
FIG. 16 is a flow diagram illustrating an embodiment of a data cross-connect process in accordance with the present invention.

In this application, the data cross-connecting can be achieved by the FTL and the CAWG in a way shown in FIG. 16, and FIG. 16 is a flow diagram illustrating an embodiment of a data cross-connect process in accordance with the present invention.

In FIG. 16, S1-1, S1-2, ..., S1-m are first stage cross-connect sub-modules at the size of n×k and at the quantity of m, FTL1, FTL2, ..., FTLk are k transmitters, hence there are m groups of transmitters (k transmitters in each group), i.e., every first stage cross-connect sub-module corresponds to k transmitters; S2-1, S2-2, ..., S2-k are second stage cross-connect modules at the size of m×m and at the quantity of k and in this application, the second stage cross-connect modules comprise CAWGs; S3-1, S3-2, ..., S3-m are third stage cross-connect sub-modules at the size of k×n and at the quantity of m, Rx1, Rx2, ..., Rxk are k receivers, hence there are m groups of receivers (k receivers in each group), i.e., every third stage cross-connect sub-module corresponds to k receivers.

In this application, the first stage cross-connecting and the second stage cross-connecting are both achieved in the electrical layer and the second stage cross-connecting is achieved primarily by the CAWGs. After the first stage cross-connect sub-modules complete the first stage cross-connect in the electrical layer, the FTLs send the optical burst signals on corresponding wavelength based on the first information to the CAWGs in the second stage and the CAWGs in the second stage send the optical burst signals from the FTLs to different destination ports to be received by different receivers Rxs; after that the third stage cross-connect sub-modules apply the third stage cross-connecting. In this way, the FTLs in FIG. 16 actually achieve two functions: one is interconnecting subracks (primarily between cable subracks and cross-connect subracks) and converting electrical signals into optical signals, the other is working with the CAWG in the second stage to achieve the second stage cross-connecting.

In another application of this embodiment, applying, by at least one second stage cross-connect module, the second stage cross-connecting to at least one channel of optical signals sent by at least one transmitter included in each of the at least two first stage cross-connect modules and sending the optical burst signals obtained after the cross-connecting to at least one third stage cross-connect module may comprise: applying, based on the second information by the space division optical cross-connect sub-module included in at least one second stage cross-connect module, the second stage cross-connecting to at least one channel of continuous optical signals sent by at least one transmitter included in each of the at least two first stage cross-connect modules and sending the optical burst signals obtained after the cross-connecting to at least one third stage cross-connect module.

Figure 17:
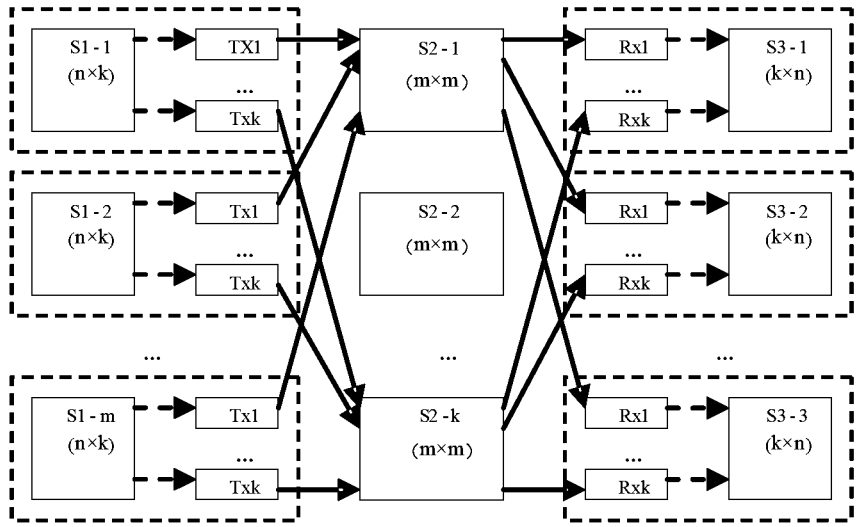
FIG. 17 is a flow diagram illustrating another embodiment of a data cross-connect process in accordance with the present invention.

In this application, the data cross-connecting can be achieved by in a way shown in FIG. 17, and FIG. 17 is a flow diagram illustrating another embodiment of a data cross-connect process in accordance with the present invention.

In FIG. 17, S1-1, S1-2, . . . , S1-m are first stage cross-connect sub-modules at the size of n×k and at the quantity of m, Tx1, Tx2, . . . , Txk are k transmitters, hence there are m groups of transmitters (k transmitters in each group), i.e., every first stage cross-connect sub-module corresponds to k transmitters; S2-1, S2-2, . . . , S2-k are second stage cross-connect modules at the size of m×m and at the quantity of k and in this application, the second stage cross-connect modules comprise space division optical cross-connect modules; S3-1, S3-2, . . . , S3-m are third stage cross-connect sub-modules at the size of k×n and at the quantity of m, Rx1, Rx2, . . . , Rxk are k receivers, hence there are m groups of receivers (k receivers in each group), i.e., every third stage cross-connect sub-module corresponds to k receivers.

In this application, the first stage cross-connecting and the third stage cross-connecting are both in the electrical layer and multiple channels of data signals go through the first stage cross-connecting in the electrical layer by the first stage cross-connect sub-module first, and are then converted into a corresponding channel of optical burst signals and sent out by the Txs. The second stage cross-connect module applies the second stage cross-connecting to the signals and the Rxs convert the optical burst signals that have gone through the cross-connecting in the optical layer into electrical signals, and sends the electrical burst signals obtained after the conversion to the third stage cross-connect sub-module for the third stage cross-connecting.

In FIG. 17, the Tx can be a colored optical interface, e.g., an optical interface in accordance with the wavelength standards of multi-channel optical systems such as a Wavelength Division Multiplexing (WDM) system and the like; the Transmitter 815 can also be a grey optical interface (i.e., white optical interface), e.g., an optical interface in accordance with the standards of intra-office systems such as the ITU-T G.693 system and the like. If the Tx in FIG. 17 is a grey optical interface, the second stage cross-connect module in FIG. 17 can be achieved by using the space division optical cross-connect sub-module shown in FIG. 5; if the Tx in FIG. 17 is a colored optical interface, the second stage cross-connect module in FIG. 17 can be achieved by using micro-ring based fast optical filter array.

The above-described embodiment provides interconnection between subracks at a high rate and thus reduces the number of interconnecting optical fibers and the connectors of the optical fibers, improves reliability and maintainability and further reduces the difficulty in design; in addition, since the second stage cross-connect module applies cross-connecting to the optical signals from the transmitter directly in the optical layer, the number of cross-connect subracks can be reduced and the size and power consumption of cross-connect subracks can also be reduced.

Figure 18:
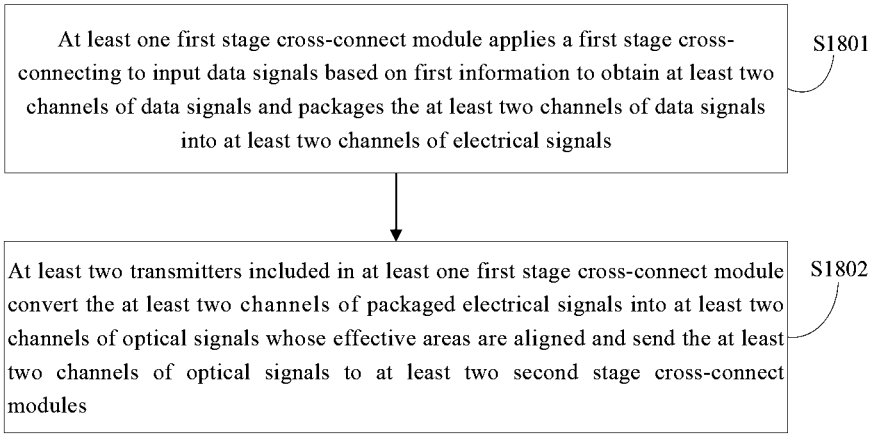
FIG. 18 is a flow diagram illustrating another embodiment of a data cross-connect method in accordance with the present invention.

FIG. 18 is a flow diagram illustrating another embodiment of a data cross-connect method in accordance with the present invention. The data cross-connect method in this embodiment can be applied to a data cross-connect system provided in any of the embodiments shown in FIGS. 8-10. As shown in FIG. 18, the data cross-connect method comprises:

Step 1801: applying a first stage cross-connecting to input data signals by at least one first stage cross-connect module based on first information to obtain at least two channels of data signals, and packaging the at least two channels of data signals into at least two channels of electrical signals; and Step 1802: converting the at least two channels of packaged electrical signals into at least two channels of optical signals whose effective areas are aligned by at least two transmitters included in the at least one first stage cross-connect module, sending the above-described at least two channels of optical signals to at least two second stage cross-connect modules so that the at least two cross-connect modules can apply a second stage cross-connecting to the at least two channels of optical signals sent by the at least two transmitters included in the at least one first stage cross-connect module and send the optical burst signals obtained after the cross-connecting to at least one third stage cross-connect module.

Furthermore, after the Step 1802, the at least one third stage cross-connect module converts the optical burst signals from the at least two second stage cross-connect modules into electrical signals, unpackages the above-described electrical signals to obtain at least two channels of data signals and applies the third stage cross-connecting to the at least two channels of data signals to obtain output data signals.

In an application of this embodiment, the transmitter may be a fast wavelength tunable transmitter module, e.g., an FTL, the second stage cross-connect module may be a CAWG and the above-described optical signals may be optical burst signals; furthermore, converting the at least two channels of packaged electrical signals into at least two channels of optical signals whose effective areas are aligned by at least two transmitters included in the at least one first stage cross-connect module may comprise: converting the at least two channels of packaged electrical signals into at least two channels of optical signals whose effective areas are aligned by at least two fast wavelength tunable transmitter modules included in the at least one first stage cross-connect module;
sending the at least two channels of optical signals to the at least two second stage cross-connect modules may comprise:
sending the at least two channels of optical burst signals to the at least two CAWGs with respective corresponding wavelengths based on the first information by the at least two fast wavelength tunable transmitter modules included in the at least one first stage cross-connect module.

The working theory of the cross-connecting in this application is shown in FIG. 16 and will not be described repeatedly herein.

In another application of this embodiment, the optical signals are continuous optical signals, and applying, by the at least two second stage cross-connect modules, a second stage cross-connecting to the at least two channels of optical burst signals sent by the at least two transmitters included in the at least one first stage cross-connect modules and sending the optical burst signals obtained after the cross-connecting to the at least one third stage cross-connect module may comprise: applying, based on second information by the space division optical cross-connect sub-modules included respectively in the at least two second stage cross-connect modules, the second stage cross-connecting to at least two channels of continuous optical signals sent by the at least two transmitter included in the at least one first stage cross-connect module and sending the optical burst signals obtained after the cross-connecting to at least one third stage cross-connect module.

The working theory of the cross-connecting in this application is shown in FIG. 17 and will not be described repeatedly herein.

The above-described embodiment provides interconnection between subracks at a high rate and thus reduces the number of interconnecting optical fibers and the connectors of the optical fibers, improves reliability and maintainability and further reduces the difficulty in design; in addition, since the second stage cross-connect module applies cross-connecting to the optical signals from the transmitter directly in the optical layer, the number of cross-connect subracks can be reduced and the size and power consumption of cross-connect subracks can also be reduced.

Those skilled in the art should understand that the embodiments of the methods described above can be achieved in part or in whole by using corresponding hardware controlled with program commands, the program described above may be stored in a computer readable storage media and the steps of the above-described embodiments of methods are carried out when the program is executed; the storage media described above may include any media that stores program codes, such as ROM, RAM, diskette or compact disk.

Those skilled in the art should understand that the accompanying drawings are just schematics of preferred embodiments of the present invention and the modules or flows shown in the drawings may not be inevitable in the application of the present invention.

Those skilled in the art should understand that the modules of the devices in the embodiments may be located in devices described in the embodiments, or, after corresponding modification, be located in one or multiple devices that are different from the description of the embodiments. The modules in an embodiment described above can be combined into one module or divided into multiple sub-modules.

It should be noted, last but not the least, that the embodiments described above are given to illustrate the technical scheme of the present invention instead of limiting the present invention; although the present invention is described in detail with reference to the above embodiments, those skilled in the art should still understand that the technical schemes of the above embodiments may be modified and some of the technical features of the technical schemes may be replaced with equivalent substitutions, yet such modification or substitution does not make the substance of such technical schemes depart from the principles and range of the technical scheme of the present invention.

What is claimed is:

1. A data cross-connect system, comprising: at least two first stage cross-connect modules, at least one second stage cross-connect module and at least one third stage cross-connect module;

the first stage cross-connect module comprises: a first stage cross-connect sub-module, a signal packaging sub-module, a first information generation sub-module and at least one transmitter;

the first information generation sub-module is configured to generate first information;

the first stage cross-connect sub-module is configured to apply a first stage cross-connecting to input data signals based on the first information generated by the first information generation sub-module to obtain at least one channel of data signals, and to send the at least one channel of data signals to the signal packaging sub-module;

the signal packaging sub-module is configured to receive the at least one channel of data signals sent by the first stage cross-connect sub-module, to package the at least one channel of data signals into at least one channel of electrical signals and to send the at least one channel of electrical signals to the at least one transmitter;

the at least one transmitter is configured to convert the at least one channel of electrical signals packaged by the signal packaging sub-module into at least one channel of optical signals whose effective areas are aligned, and to send the at least one channel of optical signals to the at least one second stage cross-connect module;

the at least one second stage cross-connect module is configured to apply a second stage cross-connecting to the at least one channel of optical signals sent by the at least one transmitter included in each of the at least two first stage cross-connect modules respectively, and to send optical burst signals obtained from the cross-connecting to the at least one third stage cross-connect module; and the at least one third stage cross-connect module is configured to receive the optical burst signals sent by the at least one second stage cross-connect module, to convert the optical burst signals into electrical signals, to unpackage the electrical signals to obtain at least one channel of data signals and to apply a third stage cross-connecting to the at least one channel of data signals to obtain output data signals.

2. The data cross-connect system according to claim 1, wherein the first stage cross-connect module further comprises: a synchronization information generation sub-module and a first clock generation sub-module;

the synchronization information generation sub-module is configured to generate synchronization information and to send the synchronization information to the signal packaging sub-module;

the first clock generation sub-module is configured to generate a first clock signal and to send the first clock signal to at least one of the signal packaging sub-module and the first stage cross-connect sub-module;

the signal packaging sub-module is configured to package the at least one channel of data signals into at least one channel of electrical signals based on the synchronization information generated by the synchronization information generation sub-module and the first clock signal generated by the first clock generation sub-module; and the first stage cross-connect sub-module is configured to apply the first stage cross-connecting to input data signals so as to obtain at least one channel of data signals based on the first information generated by first information generation sub-module and the first clock signal generated by the first clock generation sub-module.

3. The data cross-connect system according to claim 1, wherein the transmitter is a fast wavelength tunable transmitter module, the second stage cross-connect module comprises at least one cyclic arrayed waveguide grating, and the optical signals are optical burst signals;

the at least one fast wavelength tunable transmitter module is configured to convert the at least one channel of electrical signals packaged by the signal packaging sub-module into at least one channel of optical burst signals whose effective areas are aligned, and to send the at least one channel of optical burst signals to the at least one cyclic arrayed waveguide grating with respective corresponding wavelengths based on the first information generated by the first information generation sub-module.

4. The data cross-connect system according to claim 1, wherein the transmitter is a fast wavelength tunable transmitter module, the optical signals are optical burst signals, and the second stage cross-connect module comprises: at least two first space division optical cross-connect sub-modules, at least one cyclic arrayed waveguide grating, at least one second space division optical cross-connect sub-module and a second information generation sub-module;

the at least one fast wavelength tunable transmitter module is configured to convert the at least one channel of electrical signals packaged by the signal packaging sub-module into at least one channel of optical burst signals whose effective areas are aligned, and to send the at least one channel of optical burst signals to the at least two first space division optical cross-connect sub-modules with respective corresponding wavelengths based on the first information generated by first information generation sub-module;

the second information generation sub-module is configured to generate second information;

the at least two first space division optical cross-connect sub-modules are configured to send the at least one channel of optical burst signals sent by the at least one fast wavelength tunable transmitter module included in each of the at least two first stage cross-connect modules to the at least one cyclic arrayed waveguide grating based on the second information generated by the second information generation sub-module;

the at least one cyclic arrayed waveguide grating is configured to send the optical burst signals sent by the at least two first space division optical cross-connect sub-modules to the at least one second space division optical cross-connect sub-module; and the at least one second space division optical cross-connect sub-module is configured to send the optical burst signals sent by the at least one cyclic arrayed waveguide grating to the at least one third stage cross-connect module based on the second information generated by the second information generation sub-module.

5. The data cross-connect system according to claim 1, wherein the transmitter is a fast wavelength tunable transmitter module, the optical signals are optical burst signals, and the second stage cross-connect module comprises: at least one first space division optical cross-connect sub-module, at least two cyclic arrayed waveguide gratings, at least one second space division optical cross-connect sub-module and a second information generation sub-module;

the at least one fast wavelength tunable transmitter module is configured to convert the at least one channel of electrical signals packaged by the signal packaging sub-module into at least one channel of optical burst signals whose effective areas are aligned, and to send the at least one channel of optical burst signals to the at least one first space division optical cross-connect sub-module with corresponding wavelengths based on the first information generated by the first information generation sub-module;

the second information generation sub-module is configured to generate second information;

the at least one first space division optical cross-connect sub-module is configured to send the at least one channel of optical burst signals sent by the at least one fast wavelength tunable transmitter module included in each of the at least two first stage cross-connect modules to the at least two cyclic arrayed waveguide gratings based on the second information generated by the second information generation sub-module;

the at least two cyclic arrayed waveguide gratings are configured to send the optical burst signals sent by the at least one first space division optical cross-connect sub-module to the at least one second space division optical cross-connect sub-module; and the at least one second space division optical cross-connect sub-module is configured to send the optical burst signals sent by the at least two cyclic arrayed waveguide gratings to the at least one third stage cross-connect module based on the second information generated by the second information generation sub-module.

6. The data cross-connect system according to claim 1, wherein the second stage cross-connect module comprises a second information generation sub-module and a space division optical cross-connect sub-module; and the optical signals are continuous optical signals;

the at least one second information generation sub-module is configured to generate second information;

the at least one space division optical cross-connect sub-module is configured to apply, based on the second information generated by the at least one second information generation sub-module, the second stage cross-connecting to the at least one channel of continuous optical signals sent by at least one transmitter included in each of the at least two first stage cross-connect modules, and to send the optical burst signals obtained from the cross-connecting to the at least one third stage cross-connect module.

7. The data cross-connect system according to claim 1, wherein the third stage cross-connect module comprises a third information generation sub-module, a signal unpackaging sub-module, at least one receiver and a third stage cross-connect sub-module;

the at least one receiver is configured to receive optical burst signals sent by the at least one second stage cross-connect module, to convert the optical burst signals into electrical signals and to send the electrical signals to the signal unpackaging sub-module;

the signal unpackaging sub-module is configured to unpackage the electrical signals sent by the at least one receiver to obtain at least one channel of data signals;

the third information generation sub-module is configured to generate third information; and the third stage cross-connect sub-module is configured to apply, based on the third information generated by the third information generation sub-module, the third stage cross-connecting to the at least one channel of data signals obtained by the signal unpackaging sub-module so as to obtain output data signals.

8. The data cross-connect system according to claim 7, wherein the third stage cross-connect module further comprises: a second clock generation sub-module;

the second clock generation sub-module is configured to generate a second clock signal and to send the second clock signal to at least one of the signal unpackaging module and the third stage cross-connect sub-module;

the signal unpackaging sub-module is configured to unpackage, based on the second clock signal generated by the second clock generation sub-module, the electrical signals sent by the at least one receiver to obtain at least one channel of data signals; and the third stage cross-connect sub-module is configured to apply, based on the third information generated by the third information generation sub-module and the second clock signal generated by the second clock generation sub-module, the third stage cross-connecting to the at least one channel of data signals obtained by the signal unpackaging sub-module so as to obtain output data signals.

9. A data cross-connect system, comprising: at least one first stage cross-connect module, at least two second stage cross-connect modules and at least one third stage cross-connect module;

the first stage cross-connect module comprises: a first stage cross-connect sub-module, a signal packaging sub-module, a first information generation sub-module and at least two transmitters;

the first information generation sub-module is configured to generate first information;

the first stage cross-connect sub-module is configured to apply a first stage cross-connecting to input data signals based on the first information generated by the first information generation sub-module to obtain at least two channels of data signals and to send the at least two channels of data signals to the signal packaging sub-module;

the signal packaging sub-module is configured to receive the at least two channels of data signals sent by the first stage cross-connect sub-module, to package the at least two channels of data signals into at least two channels of electrical signals and to send the at least two channels of electrical signals to the at least two transmitters;

the at least two transmitters are configured to convert the at least two channels of electrical signals packaged by the signal packaging sub-module into at least two channels of optical signals whose effective areas are aligned, and to send the at least two channels of optical signals to the at least two second stage cross-connect modules respectively;

the at least two second stage cross-connect modules are configured to apply a second stage cross-connecting to the at least two channels of optical signals sent by the at least two transmitters included in the at least one first stage cross-connect module, and to send optical burst signals obtained from the cross-connecting to the at least one third stage cross-connect module; and the at least one third stage cross-connect module is configured to receive the optical burst signals sent by at least one of the at least two second stage cross-connect modules, to convert the optical burst signals into electrical signals, to unpackage the electrical signals to obtain at least one channel of data signals, and to apply a third stage cross-connecting to the at least one channel of data signals to obtain output data signals.

10. The data cross-connect system according to claim 9, wherein the first stage cross-connect module further comprises: a synchronization information generation sub-module and a first clock generation sub-module;

the synchronization information generation sub-module is configured to generate synchronization information and to send the synchronization information to the signal packaging sub-module;

the first clock generation sub-module is configured to generate a first clock signal and to send the first clock signal to at least one of the signal packaging sub-module and the first stage cross-connect sub-module;

the signal packaging sub-module is configured to package the at least two channels of data signals into at least two channels of electrical signals based on the synchronization information generated by the synchronization information generation sub-module and the first clock signal generated by the first clock generation sub-module; and the first stage cross-connect sub-module is configured to apply the first stage cross-connecting to input data signals so as to obtain at least two channels of data signals based on the first information generated by first information generation sub-module and the first clock signal generated by the first clock generation sub-module.

11. The data cross-connect system according to claim 9, wherein the transmitter is a fast wavelength tunable transmitter module, the second stage cross-connect module comprises at least two cyclic arrayed waveguide gratings, and the optical signals are optical burst signals;

the at least two fast wavelength tunable transmitter modules are configured to convert the at least two channels of electrical signals packaged by the signal packaging sub-module into at least two channels of optical burst signals whose effective areas are aligned, and to send the at least two channels of optical burst signals to the at least two cyclic arrayed waveguide gratings with respective corresponding wavelengths based on the first information generated by the first information generation sub-module.

12. The data cross-connect system according to claim 9, wherein the second stage cross-connect module comprises a second information generation sub-module and a space division optical cross-connect sub-module; and the optical signals are continuous optical signals;

the at least two second information generation sub-modules are configured to generate second information and to send the second information respectively to at least two space division optical cross-connect sub-modules;

the at least two space division optical cross-connect sub-modules are configured to apply, based on the second information generated by the at least two second information generation sub-modules, the second stage cross-connecting to the at least two channels of continuous optical signals sent by the at least two transmitters included in the at least one first stage cross-connect module, and to send the optical burst signals obtained from the cross-connecting to the at least one third stage cross-connect module.

13. The data cross-connect system according to claim 9, wherein the third stage cross-connect module comprises: a third information generation sub-module, a signal unpackaging sub-module, at least one receiver and a third stage cross-connect sub-module;

the at least one receiver is configured to receive optical burst signals sent by at least one of the at least two second stage cross-connect modules, to convert the optical burst signals into electrical signals and to send the electrical signals to the signal unpackaging sub-module;

the signal unpackaging sub-module is configured to unpackage the electrical signals sent by the at least one receiver to obtain at least one channel of data signals;

the third information generation sub-module is configured to generate third information; and the third stage cross-connect sub-module is configured to apply, based on the third information generated by the third information generation sub-module, the third stage cross-connecting to the at least one channel of data signals obtained by the signal unpackaging sub-module so as to obtain output data signals.

14. The data cross-connect system according to claim 13, wherein the third stage cross-connect module further comprises a second clock generation sub-module;

the second clock generation sub-module is configured to generate a second clock signal and to send the second clock signal to at least one of the signal unpackaging sub-module and the third stage cross-connect sub-module;

the signal unpackaging sub-module is configured to unpackage, based on the second clock signal generated by the second clock generation sub-module, the electrical signals sent by the at least one receiver to obtain at least one channel of data signals; and the third stage cross-connect sub-module is configured to apply, based on the third information generated by the third information generation sub-module and the second clock signal generated by the second clock generation sub-module, the third stage cross-connecting to the at least one channel of data signals obtained by the signal unpackaging sub-module so as to obtain output data signals.

15. A data cross-connect method, comprising:

applying a first stage cross-connecting to input data signals by at least two first stage cross-connect modules based on first information to obtain at least one channel of data signals;

packaging the at least one channel of data signals into at least one channel of electrical signals;

converting the at least one channel of packaged electrical signals into at least one channel of optical signals whose effective areas are aligned by at least one transmitter included in each of the at least two first stage cross-connect modules;

sending the at least one channel of optical signals to at least one second stage cross-connect module; applying, by the at least one second stage cross-connect module, a second stage cross-connecting to the at least one channel of optical signals sent by the at least one transmitter included in each of the at least two first stage cross-connect modules to obtain optical burst signals; and sending by the at least one second stage cross-connect module the optical burst signals obtained from the cross-connecting to at least one third stage cross-connect module.

16. The method according to claim 15, wherein the transmitter is a fast wavelength tunable transmitter module, the second stage cross-connect module comprises at least one cyclic arrayed waveguide grating, and the optical signals are optical burst signals;

said converting the at least one channel of packaged electrical signals into at least one channel of optical signals whose effective areas are aligned by at least one transmitter included in each of the at least two first stage cross-connect modules further comprises:

converting the at least one channel of packaged electrical signals into at least one channel of optical burst signals whose effective areas are aligned by at least one fast wavelength tunable transmitter module included in each of the at least two first stage cross-connect modules;

said sending the at least one channel of optical signals to at least one second stage cross-connect module further comprises:

sending the at least one channel of optical signals to the at least one cyclic arrayed waveguide grating with respective corresponding wavelengths based on the first information by at least one fast wavelength tunable transmitter module included in each of the two first stage cross-connect modules.

17. The method according to claim 15, wherein the optical signals are continuous optical signals;

applying a second stage cross-connecting by the at least one second stage cross-connect module to the at least one channel of optical signals sent by the at least one transmitter included in each of the at least two first stage cross-connect modules and sending the optical burst signals obtained from the cross-connecting to at least one third stage cross-connect module further comprises:

applying the second stage cross-connecting, based on second information by the space division optical cross-connect sub-module included in the at least one second stage cross-connect module, to the at least one channel of continuous optical signals sent by the at least one transmitter included in each of the at least two first stage cross-connect modules; and sending the optical burst signals obtained from the cross-connecting to at least one third stage cross-connect module.

18. The method according to claim 15, after applying a second stage cross-connecting by the at least one second stage cross-connect module to the at least one channel of optical signals sent by the at least one transmitter included in each of the at least two first stage cross-connect modules and sending the optical burst signals obtained from the cross-connecting to at least one third stage cross-connect module, the method further comprises:

converting, by the at least one third stage cross-connect module, the optical burst signals sent by the at least one second stage cross-connect module into electrical signals;

unpackaging the electrical signals to obtain at least one channel of data signals; and applying a third stage cross-connecting to the at least one channel of data signals to obtain output data signals.

19. A data cross-connect method, comprising:

applying a first stage cross-connecting to input data signals by at least one first stage cross-connect module based on first information to obtain at least two channels of data signals;

packaging the at least two channels of data signals into at least two channels of electrical signals;

converting the at least two channels of packaged electrical signals into at least two channels of optical signals whose effective areas are aligned by at least two transmitters included in the at least one first stage cross-connect module;

sending the at least two channels of optical signals to at least two second stage cross-connect modules;

applying by the at least two cross-connect modules, a second stage cross-connecting to the at least two channels of optical signals sent by the at least two transmitters included in the at least one first stage cross-connect module to obtain optical burst signals; and sending, by the at least two cross-connect modules, the optical burst signals obtained from the cross-connecting to at least one third stage cross-connect module.

20. The method according to claim 19, wherein the transmitter is a fast wavelength tunable transmitter module, the second stage cross-connect module comprises at least two cyclic arrayed waveguide gratings, and the optical signals are optical burst signals;

said converting the at least two channels of packaged electrical signals into at least two channels of optical signals whose effective areas are aligned by at least two transmitters included in the at least one first stage cross-connect module further comprises:

converting the at least two channels of packaged electrical signals into at least two channels of optical burst signals whose effective areas are aligned by at least two fast wavelength tunable transmitter modules included in the at least one first stage cross-connect module; and said sending the at least two channels of optical signals to at least two second stage cross-connect modules further comprises:

sending the at least two channels of optical burst signals to the at least two cyclic arrayed waveguide gratings with corresponding wavelengths based on the first information by at least two fast wavelength tunable transmitter modules included in the at least one first stage cross-connect module.

21. The method according to claim 19, wherein the optical signals are continuous optical signals;

applying a second stage cross-connecting by the at least two second stage cross-connect modules to the at least two channels of optical signals sent by the at least two transmitters included in the at least one first stage cross-connect module and sending the optical burst signals obtained from the cross-connecting to at least one third stage cross-connect module further comprises:

applying the second stage cross-connecting, based on second information by space division optical cross-connect sub-modules included in the at least two second stage cross-connect modules, to the at least two channels of continuous optical signals sent by the at least two transmitters included in the at least one first stage cross-connect module; and sending the optical burst signals obtained from the cross-connecting to at least one third stage cross-connect module.

22. The method according to claim 19, after applying a second stage cross-connecting by the at least two second stage cross-connect modules to the at least two channels of optical signals sent by the at least two transmitters included in the at least one first stage cross-connect module and sending the optical burst signals obtained from the cross-connecting to at least one third stage cross-connect module, the method further comprising:

converting, by the at least one third stage cross-connect module, the optical burst signals sent by the at least two second stage cross-connect modules into electrical signals;

unpackaging the electrical signals to obtain at least two channels of data signals; and applying a third stage cross-connecting to the at least two channels of data signals to obtain output data signals.

* * * * *